US010438214B1

(12) United States Patent
Kim et al.

(10) Patent No.: US 10,438,214 B1
(45) Date of Patent: Oct. 8, 2019

(54) SYSTEM AND METHOD FOR MOBILE DISTRIBUTION AND USE OF COUPONS

(71) Applicant: WALGREEN CO., Deerfield, IL (US)

(72) Inventors: Anthony Kim, Chicago, IL (US); Mathew Alexander, Schaumburg, IL (US)

(73) Assignee: WALGREEN CO., Deerfield, IL (US)

( * ) Notice: Subject to any disclaimer, the term of this patent is extended or adjusted under 35 U.S.C. 154(b) by 1017 days.

(21) Appl. No.: 13/650,766

(22) Filed: Oct. 12, 2012

(51) Int. Cl.
*G06Q 30/02* (2012.01)
(52) U.S. Cl.
CPC .................................. *G06Q 30/02* (2013.01)
(58) Field of Classification Search
None
See application file for complete search history.

(56) References Cited

U.S. PATENT DOCUMENTS

| 8,055,508 | B1* | 11/2011 | Leblang | B65G 1/1373 |
| | | | | 705/1.1 |
| 2006/0224693 | A1* | 10/2006 | Gaidemak | H04L 67/34 |
| | | | | 709/217 |
| 2009/0125396 | A1* | 5/2009 | Otto | G06Q 10/087 |
| | | | | 705/14.26 |
| 2009/0271275 | A1* | 10/2009 | Regmi | G06Q 20/209 |
| | | | | 705/14.73 |
| 2010/0030643 | A1* | 2/2010 | Sion | G06Q 30/02 |
| | | | | 705/14.49 |
| 2010/0312630 | A1* | 12/2010 | Krutchik | G06Q 30/02 |
| | | | | 705/14.35 |
| 2011/0093344 | A1* | 4/2011 | Burke | G06Q 20/20 |
| | | | | 705/14.65 |
| 2011/0106613 | A1* | 5/2011 | Felt | G01C 21/00 |
| | | | | 705/14.46 |
| 2011/0251897 | A1* | 10/2011 | Litvack | G06Q 30/02 |
| | | | | 705/14.58 |
| 2012/0047003 | A1* | 2/2012 | Hammad | G06Q 30/0207 |
| | | | | 705/14.1 |
| 2012/0084122 | A1* | 4/2012 | Boehle | G06Q 30/06 |
| | | | | 705/14.1 |
| 2012/0136712 | A1* | 5/2012 | Chang | G06Q 20/20 |
| | | | | 705/14.38 |

(Continued)

OTHER PUBLICATIONS

"Build an App with New GPS Notifications fom iBuildApp" (published online on Nov. 28, 2011 on https://ibuildapp.com/build-an-app-with-new-gps-notifications-from-ibuildapp/).*

*Primary Examiner* — James M Detweiler
(74) *Attorney, Agent, or Firm* — Marshall, Gerstein & Borun LLP; Randall G. Rueth

(57) ABSTRACT

The system and methods allow a user to request and receive an electronic coupon using a client application on an internet-enabled device such as a mobile phone and use the electronic coupon when making a purchase at a store. Specifically, the mobile device requests and receives the mobile coupon from a server or a network of servers. The server or network of servers determines which if any electronic coupon(s) to send to the client application and sends an electronic coupon to the client application. The client application displays the electronic coupon with a coupon identifier on the display of the mobile device. The user then uses the mobile device to enter the coupon identifier into a point-of-sale terminal to trigger the discount or other special deal offered on the electronic coupon when making a purchase at the point-of-sale terminal.

10 Claims, 19 Drawing Sheets

(56) References Cited

U.S. PATENT DOCUMENTS

| | | | |
|---|---|---|---|
| 2012/0150634 A1* | 6/2012 | Shimpa | G06Q 30/0251 |
| | | | 705/14.49 |
| 2013/0046632 A1* | 2/2013 | Grigg | G06Q 30/02 |
| | | | 705/14.58 |
| 2013/0317893 A1* | 11/2013 | Nelson | G06Q 10/02 |
| | | | 705/14.5 |
| 2014/0067512 A1* | 3/2014 | Hanson | G06Q 30/02 |
| | | | 705/14.35 |

* cited by examiner

US 10,438,214 B1

SYSTEM AND METHOD FOR MOBILE DISTRIBUTION AND USE OF COUPONS

TECHNICAL FIELD

The present disclosure generally relates to a system and a method for accessing and using coupons on a mobile device and, more particularly, to a mobile application distribution and usage system and method allowing a user to access a coupon on a mobile device and use the coupon at the point of sale.

BACKGROUND

Coupons are widely used by a variety of retailers to entice customers into purchasing goods and services. Redemption of coupons is typically performed at the point of sale by handing a piece of paper to the cashier. Typically, the cashier will type in, scan, or otherwise enter a code associated with the coupon (e.g., a barcode on the piece of paper) and then applying the special deal being offered to the bearer of the coupon (e.g., a discounted price, buy one get one free, a gift of some other item or service, etc.). In the past, redeeming a coupon at the point of sale at a brick and mortar store required a piece of paper which was taken by the cashier at the point of sale. More recently, network-enabled mobile devices have given users the ability to display a code (e.g., one dimensional barcode, two dimensional barcode, alphanumeric code, etc.) on the display of the mobile device and this code can be entered by the cashier or self checkout machine to redeem the special deal.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment of thereof. Further, wherever possible, the following description refers to the reference numerals included in the following figures, in which features depicted in multiple figures are designated with consistent reference numerals.

DETAILED DESCRIPTION

Figure 1A:
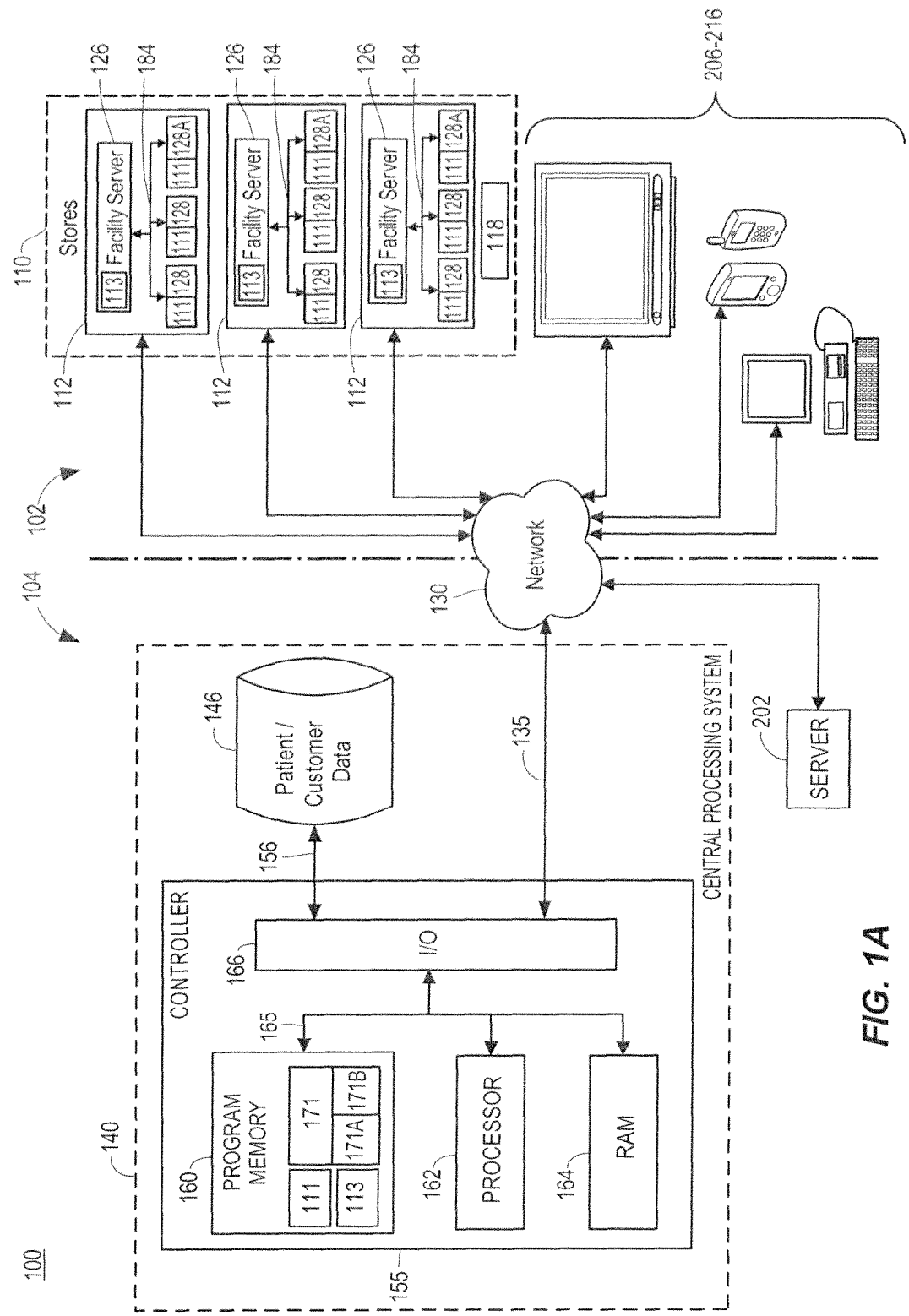
FIG. 1A illustrates a block diagram of a computer network and system on which an exemplary mobile coupon system and method may operate in accordance with the described embodiments.

FIG. 1A illustrates various aspects of an exemplary architecture implementing a mobile coupon system 100. In particular, FIG. 1A illustrates a block diagram of the mobile coupon system 100. The high-level architecture includes both hardware and software applications, as well as various data communications channels for communicating data between the various hardware and software components. The mobile coupon system 100 may be roughly divided into front-end components 102 and back-end components 104. The front-end components 102 are primarily disposed within a retail network 110 including one or more stores 112. The stores 112 may be located, by way of example rather than limitation, in separate geographic locations from each other, including different areas of the same city, different cities, or even different states. The front-end components 102 comprise a number of point of sale terminals ("POS terminals") 128. The POS terminals 128 are local computers located in the various stores 112 throughout the retail network 110 and executing various checkout or cashier applications such as accepting payment and redeeming coupons (discussed below). The POS terminals 128 may be a checkout counter or lane situated in a fixed location in the store 112 where an employee uses a checkout terminal to total the a customer's desired purchases and accept payment, mobile checkout terminals that can be brought to a customer for convenient on-the-spot payment, an automated self checkout terminal where a customer can total his or her own purchases and pay the self checkout terminal, etc. The stores 112 may be any of several kinds of retailers such as retail pharmacies, grocery stores, clothing stores, general retail stores, specialty retail stores, etc. or any other place where a POS terminal 128 can be used to total a customer's desired purchases and accept payment. The retail network 110 may also include one or more warehouses or central-filling facilities 118. The warehouses or central-filling facilities 118 may distribute medications or retail products to the various retail stores 112 in the retail network 110, or may distribute medications or retail products directly to customers. Network-enabled mobile devices 206-216 (e.g., mobile personal computers, cellular phones, smart phones, tablet computers, watches or other wearable computers, thin-client devices, etc.) may be communicatively connected to the stores 112 and to a system 140 through a digital network 130, as described below.

Those of ordinary skill in the art will recognize that the front-end components 102 could also comprise a plurality of facility servers 126 disposed at the plurality of stores 112 instead of, or in addition to, a plurality of POS terminals 128. Each of the stores 112 may include one or more facility servers 126 that may facilitate communications between the POS terminals 128 of the stores 112 via a digital network 130, and may store information for a plurality of customers/employees/accounts/etc. associated with each facility. Of course, a local digital network 184 may also operatively connect each of the POS terminals 128 to the facility server 126. Unless otherwise indicated, any discussion of the POS terminals 128 also refers to the facility servers 126, and vice versa. Moreover, environments other than the stores 112 may employ the POS terminals 128 and the servers 126. As used herein, the term "store" refers to any of these environments (e.g., vending machine, call centers, kiosks, Internet interface terminals, etc.) in addition to the retail stores 112, etc. described above. Accordingly, in some embodiments a store 112 is a brick and mortar store or some other retail establishment with a physical presence with which the customer interacts, but in other embodiments a store 212 may be a stand-alone POS terminal displaying a store web page.

The front-end components 102 communicate with the back-end components 104 via the digital network 130. One or more of the front-end components 102 may be excluded from communication with the back-end components 104 by configuration or by limiting access due to security concerns. For example, the network-enabled devices 206-216 may be excluded from direct access to the back-end components 104. In some embodiments, the stores 112 may communicate with the back-end components via the digital network 130. In other embodiments, the stores 112 and network-enabled devices 206-216 may communicate with the back-end components 104 via the same digital network 130, but digital access rights, IP masking, and other network configurations may deny access to the network-enabled devices 206-216.

The digital network 130 may be a proprietary network, a secure public Internet, a virtual private network or some other type of network, such as dedicated access lines, plain ordinary telephone lines, satellite links, combinations of these, etc. Where the digital network 130 comprises the Internet, data communication may take place over the digital network 130 via an Internet communication protocol. In addition to one or more servers 202 (described below), the back-end components 104 include the central processing system 140 within a central processing facility, such as, for example, the central processing facility described in U.S. patent application Ser. No. 12/271,686 entitled "DISTRIBUTED PHARMACY PRESCRIPTION PROCESSING SYSTEM" the entire disclosure of which is incorporated by reference herein. Of course, the stores 112 may be communicatively connected to different back-end components 104 having one or more functions or capabilities that are similar to the central processing system 140. The central processing system 140 may include one or more computer processors 162 adapted and configured to execute various software applications and components of the mobile coupon system 100, in addition to other software applications. The central processing system 140 further includes a database 146. The database 146 is adapted to store data related to the operation of the mobile coupon system 100 (e.g., customer profiles, user or customer preferences, customer purchase history, database of coupons offered, etc.) The central processing system 140 may access data stored in the database 146 when executing various functions and tasks associated with the operation of the mobile coupon system 100.

Although FIG. 1A depicts the mobile coupon system 100 as including the central processing system 140 in communication with three stores 112, and various network-enabled devices 206-216 it should be understood that different numbers of processing systems, pharmacies, and devices may be utilized. For example, the digital network 130 (or other digital networks, not shown) may interconnect the central processing system 140 to a plurality of included central processing systems 140, hundreds of stores 112, and thousands of network-enabled devices 206-216. According to the disclosed example, this configuration may provide several advantages, such as, for example, enabling near real-time uploads and downloads of information as well as periodic uploads and downloads of information. This provides for a primary backup of all the information generated in the mobile coupon process. Alternatively, some of the stores 112 may store data locally on the facility server 126 and/or the workstations 128.

FIG. 1A also depicts one possible embodiment of the central processing system 140. The central processing system 140 may have a controller 155 operatively connected to the database 146 via a link 156 connected to an input/output (I/O) circuit 166. It should be noted that, while not shown, additional databases may be linked to the controller 155 in a known manner.

The controller 155 includes a program memory 160, the processor 162 (may be called a microcontroller or a microprocessor), a random-access memory (RAM) 164, and the input/output (I/O) circuit 166, all of which are interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM(s) 164 and the program memories 160 may be implemented as semiconductor memories, magnetically readable memories, and/or optically readable memories, for example. A link 135 may operatively connect the controller 155 to the digital network 130 through the I/O circuit 166.

The program memory 160 may also contain machine-readable instructions (i.e., software) 171, for execution by the processor 162. The software 171 may perform the various tasks associated with operation of the store or stores, and may be a single module 171 or a plurality of modules 171A, 171B. While the software 171 is depicted in FIG. 1A as including two modules, 171A and 171B, the software 171 may include any number of modules accomplishing tasks related to retail operation including, for example, inventory management, payment processing, coupon redemption etc. The central processing system 140 implements a server application 113 for providing data to a user interface application 111 operating on the workstations 128.

Figure 1B:
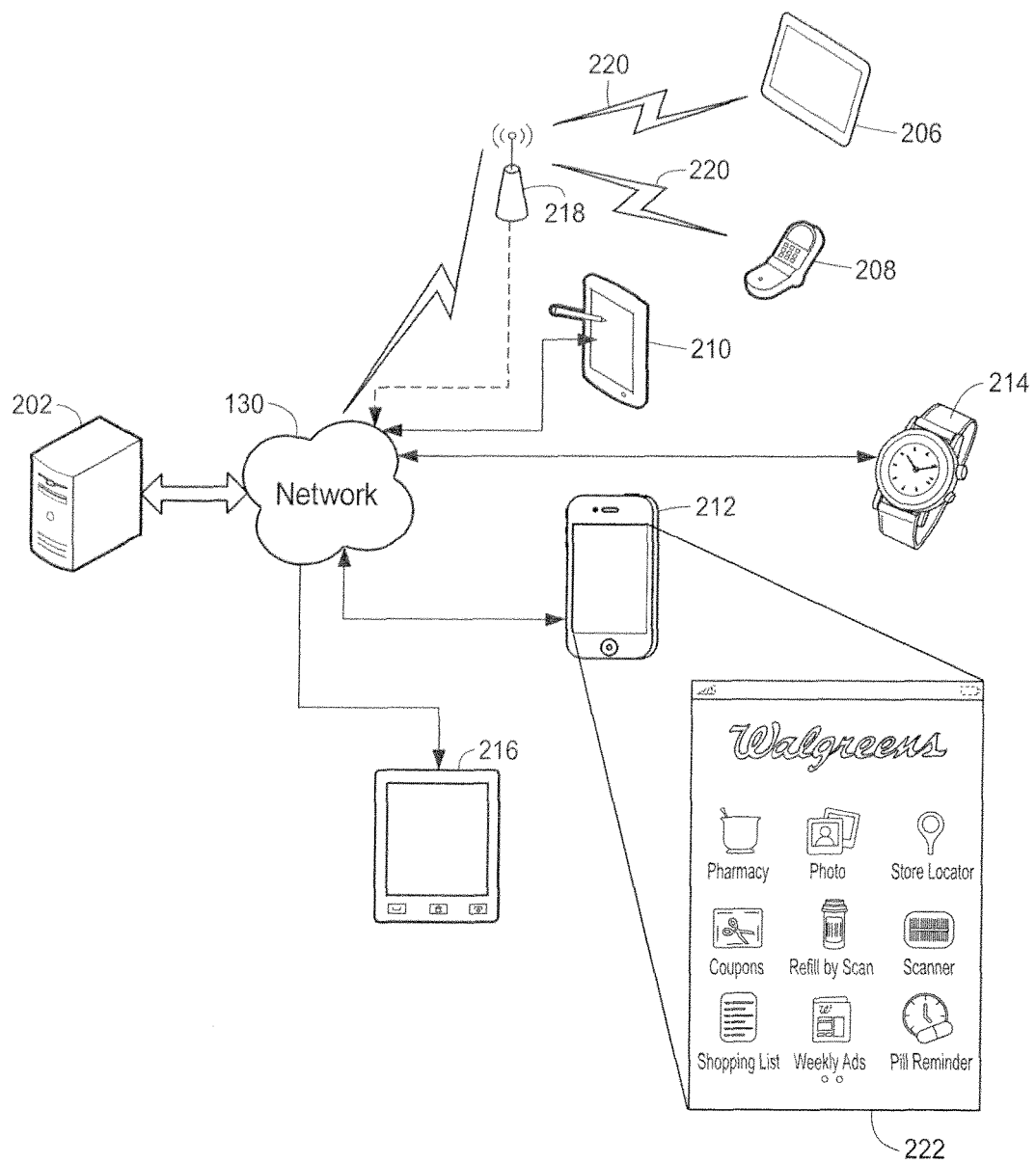
FIG. 1B illustrates network-enabled devices and associated equipment that may operate with a network and a server.

For purposes of implementing the mobile coupon system 100, the customer interacts with the server 202 and the store systems (e.g., the central processing system 140) via protocol network-enabled device 206-216 (e.g., mobile device application, etc.). FIG. 1B depicts the server 202 connected via the network 130 to the network-enabled devices 206-216 through which a user may initiate and interact with the mobile coupon system 100 (as shown in FIG. 1A). The network-enabled devices 206-216 may include, by way of example, a tablet computer 206, an internet-enabled cell phone 208, a personal digital assistant (PDA) 210, a mobile device smart-phone 212 also referred to herein as a "mobile device," a watch or other wearable computer 214, a thin-client device 216, a portable media player (not shown), etc. Of course, any network-enabled device appropriately configured may interact with the mobile coupon system 100. A thin-client device 216 is a network-enabled device that depends on a master computing device (e.g., a server, a mainframe computer, etc.) to which it is connected through a network interface. A thin-client device 216 may depend on the server to handle many functions that are performed locally by traditional computing systems (e.g., data storage and access, data processing). For example, a thin-client device 216 may merely act as a remote input/output device that accepts user input and transmit the input to the server. Then, the server may process the input and transmit output as well as accessing or storing data as needed. Thus, the thin-client device 216 could be a more streamlined device, requiring only an input device (e.g., a touch-screen), an output device (e.g., a touch-screen), networking capability (e.g., a transmitter and receiver), and the necessary software to accept input, relay it to the server, and accept and display output. Of course, a thin-client device 216 may perform a larger number of processes locally and leave only a few functions (e.g., data persistence) for the server to perform.

The network-enabled devices 206-216 need not necessarily communicate with the network 130 via a wired connection. In some instances, the network-enabled devices 206-216 may communicate with the network 130 via wireless signals 220 and, in some instances, may communicate with the network 130 via an intervening wireless or wired device 218, which may be a wireless router, a wireless repeater, a base transceiver station of a mobile telephony provider, etc. Each of the network-enabled devices 206-216 may interact with the server 202 to receive web pages or server data from the server 202 and may display the web pages or server data via a client application (described below). For example, the mobile device 212 may display a home screen 222 (i.e., the root or start page at which users enter the client application) of the client application to user, may receive an input from the user, and may interact with the server 202 depending on the type of user-specified input. It will be appreciated that although only one server 202 is depicted in FIG. 1B, multiple servers 202 may be provided for the purpose of distributing server load, serving different web pages, implementing different portions of the store web interface, etc. These multiple servers 202 may include a web server, an entity-specific server (e.g. an Apple® server, etc.), a server that is disposed in a retail or proprietary network, an independent third-party server that is not under the control of the entity, etc.

Figure 1C:
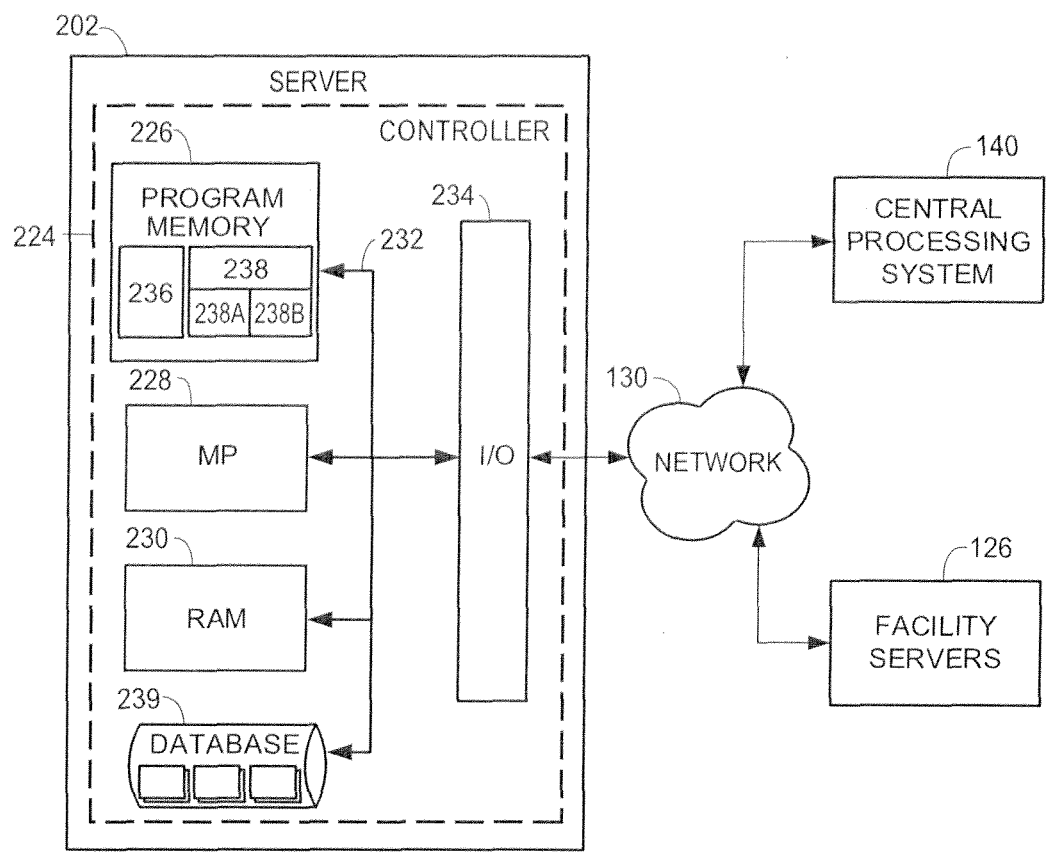
FIG. 1C illustrates a block diagram of an exemplary server.

Turning now to FIG. 1C, the server 202, like the facility server 126, includes a controller 224. Similar to the controllers 155 and 170, the controller 224 includes a program memory 226, a microcontroller or a microprocessor (MP) 228, a random-access memory (RAM) 230, and an input/output (I/O) circuit 234, all of which are interconnected via an address/data bus 232. In some embodiments, the controller 224 may also include, or otherwise be communicatively connected to, a database 239 or other data storage mechanism (e.g., one or more hard disk drives, optical storage drives, solid state storage devices, etc.). The database 239 may include data such as available coupons, customer or user profiles, customer or user preferences, product data, mobile device application data, web page templates and/or web pages, and other data necessary to interact with the user through the network 130. As discussed with reference to the controllers 155 and 170, it should be appreciated that although FIG. 1C depicts only one microprocessor 228, the controller 224 may include multiple microprocessors 228. Similarly, the memory of the controller 224 may include multiple RAMs 230 and multiple program memories 226. Although FIG. 1C depicts the I/O circuit 234 as a single block, the I/O circuit 234 may include a number of different types of I/O circuits. The controller 224 may implement the RAM(s) 230 and the program memories 226 as semiconductor memories, magnetically readable memories, and/or optically readable memories, for example.

In addition to being connected through the network 130 to the network enabled devices 206-216, as depicted in FIG. 1B, FIG. 1C illustrates that the server 202 may also be connected through the network 130 to the central processing system 140 and/or one or more facility servers 126. As described below, the connection of the server 202 to the central processing system 140 assists in facilitating some of the functionality of the mobile coupon process. As a result, the server 202 may act as a routing or interfacing server between the plurality of network-enabled devices 206-216 and a destination server, namely, the central processing system 140. For example, the server 202 may be configured to communicate the central processing system 140 and with the network-enabled device 206-216 via a multitude of protocols, such as packet-switched protocols, web services, web APIs, etc. The server 202 may also convert (if necessary) and route client application data (not shown) to the appropriate server, such as the central process system 140 for example. Additionally, the server 202 may act as the destination server and need not route any data from the internet-enabled device 206-216.

As shown in FIG. 1C, the program memory 226 and/or the RAM 230 may store various applications for execution by the microprocessor 228. For example, a user-interface application 236 may provide a user interface to the server 202, which may, for example, allow a network administrator to configure, troubleshoot, or test various aspects of the server's operation, or otherwise to access information thereon. A server application 238 operates to populate and transmit client application data and web pages to the network-enabled devices 206-216, receive information from the user transmitted back to the server 202, and forward appropriate data to the central processing system 140 and the facility servers 126, as described below. Like the software 171 of FIGS. 1A and 1B, the server application 238 may be a single module 238 or a plurality of modules 238A, 238B. While the server application 238 is depicted in FIG. 1C as including two modules, 238A and 238B, the server application 238 may include any number of modules accomplishing tasks related to implementation of the server 202. By way of example, the module 238A may populate and transmit the client application data and/or may receive and evaluate inputs from the user to receive a mobile coupon request, while the module 238B may communicate with one or more of the back end components 104 to fulfill a data access request.

Figure 1D:
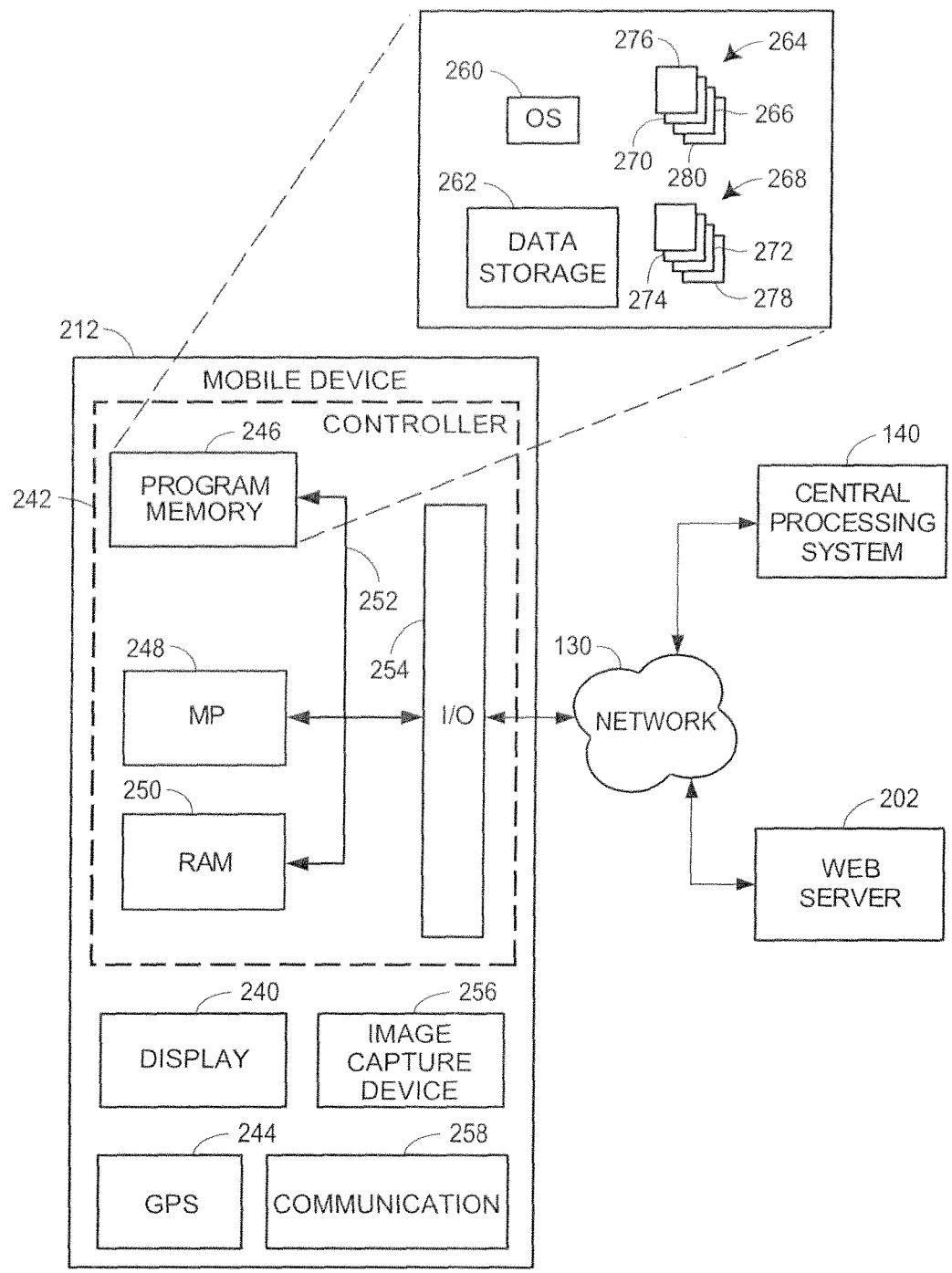
FIG. 1D illustrates a block diagram of an exemplary mobile device.

Referring now to FIG. 1D, the mobile device 212 (or any of the internet-enabled devices 206-216) includes a display 240, a Global Positioning System (GPS) unit 244, a communication unit 258, an image capture device 256, a user-input device (not shown), and, like the server 202, a controller 242. Similar to the controllers 155 and 224, the controller 242 includes a program memory 246, one or more microcontroller or a microprocessor (MP) 248, a random-access memory (RAM) 250, and an input/output (I/O) circuit 254, all of which are interconnected via an address/data bus 252. The program memory 246 includes an operating system 260, a data storage 262, a plurality of software applications 264, and a plurality of software routines 268. The operating system 260, for example, may include one of a plurality of mobile platforms such as the iOS®, Android™, Palm® webOS, Windows Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage 262 may include data such as user profiles and preferences, application data for the plurality of applications 264, routine data for the plurality of routines 268, and other data necessary to interact with the server 202, the facility servers 126, or the server applications 113 through the digital network 130. In some embodiments, the controller 242 may also include, or otherwise be communicatively connected to, other data storage mechanisms (e.g., one or more hard disk drives, optical storage drives, solid state storage devices, etc.) that reside within the mobile device 212.

The GPS unit 244 may use "Assisted GPS" (A-GPS), satellite GPS, or any other suitable global positioning protocol (e.g., the GLONASS system operated by the Russian government) or system that locates the position the mobile device 212. For example, A-GPS utilizes terrestrial cell phone towers or Wi-Fi hotspots (e.g., wireless router points) to more accurately and more quickly determine location of the mobile device 212 while satellite GPS generally are more useful in more remote regions that lack cell towers or Wi-Fi hotspots. The communication unit 258 may communicate with the server 202 via any suitable wireless communication protocol network, such as a wireless telephony network (e.g., GSM, CDMA, LTE, etc.), a Wi-Fi network (802.11 standards), a WiMAX network, a Bluetooth network, etc. The image capture device 256 may be a built-in camera within the mobile device 212 or may be an external camera, such as a webcam, that is communicatively coupled with the mobile device 212 (or any other internet-enabled device 206-216). The communication unit 258 may also be capable of communicating with POS terminal 128 or other computer using a near field communication standard (e.g., ISO/IEC 18092, standards provided by the NFC Forum, etc.). Such near field communications may allow the mobile device 212 to authorize the POS terminal 128 to charge an account (e.g., a credit card account, a debit card account, or a bank account) linked with the mobile device 212 or client application 266 for the purchase being made with the POS terminal 128. In some embodiments, near field communications may also be used to communicate the code used to trigger the offered coupon deal as an alternative to scanning a barcode or manually entering a number as discussed below. The user-input device (not shown) may include a "soft" keyboard that is displayed on the display 240 of the mobile device 212, an external hardware keyboard communicating via a wired or a wireless connection (e.g., a Bluetooth keyboard), an external mouse, or any other suitable user-input device. The user-input device (not shown) may also include a microphone capable of receiving user voice input. As discussed with reference to the controllers 155 and 224, it should be appreciated that although FIG. 1D depicts only one microprocessor 248, the controller 242 may include multiple microprocessors 248. Similarly, the memory of the controller 242 may include multiple RAMs 250 and multiple program memories 246. Although the FIG. 1D depicts the I/O circuit 254 as a single block, the I/O circuit 254 may include a number of different types of I/O circuits. The controller 242 may implement the RAM(s) 250 and the program memories 246 as semiconductor memories, magnetically readable memories, and/or optically readable memories, for example.

The one or more processors 248 may be adapted and configured to execute any one or more of the plurality of software applications 264 and/or any one or more of the plurality of software routines 268 residing in the program memory 242, in addition to other software applications. One of the plurality of applications 264 may be a client application 266 that may be implemented as a series of machine-readable instructions for performing the various tasks associated with receiving information at, displaying information on, and transmitting information from the mobile device 212. One of the plurality of applications 264 may be a native web browser 270, such as Apple's Safari®, Google Android™ mobile web browser, Microsoft Internet Explorer® for Mobile, Opera Mobile™, that may be implemented as a series of machine-readable instructions for receiving, interpreting, and displaying web page information from the server 202, the facility servers 126, or the server applications 113 while also receiving inputs from the user. Another application of the plurality of applications may include an embedded web browser 276 that may be implemented as a series of machine-readable instructions for receiving, interpreting, and displaying web page information from the servers 202, 126, or server applications 113 within the client application 266. One of the plurality of routines may include an image capture routine 272 that coordinates with the image capture device 256 to retrieve image data for use with one or more of the plurality of applications, such as the client application 266, or for use with other routines. Another routine in the plurality of routines may include a barcode scanning routine 274 that determines a barcode type from the image data and decodes the barcode into decoded data according to the barcode type. Likewise, the barcode scanning routine 274 coordinates with the image capture routine to obtain image data and process the image data into a barcode type and decoded data for use with the client application 266.

Preferably, a customer, a patient, or a user may launch the client application 266 from an internet-enabled device, such as one of the internet-enabled devices 206-216, to access the server 202 cooperating with the central processing system 140 and the stores 112 to implement the mobile coupon system 100. Additionally, the customer or the user may also launch or instantiate any other suitable user interface application (e.g., the native web browser 270, or any other one of the plurality of software applications 264) to access the server 202, the facility servers 126, or the server applications 113 to realize the mobile coupon system 100. As used herein, the term "customer" indicates someone purchasing a retail product, interested in purchasing a retail product, browsing the store 112, etc. Moreover, the term "customer" is not limited to a single person, but may instead be any person or persons having a reason or desire to purchase one or more retail products. Generally, the term "user" is used when referring to a person who is operating one of the internet-enabled devices 206-216 and is not exclusive of the terms "customer" and "patient."

As described above, one or both of the databases 146 and 182, illustrated in FIGS. 1A and 1B, respectively, include various information about the store's customers and the products sold at the store, as well as basic biographical information about the customer, such as a customer name, a customer address, a customer phone number, and the like. Customer records are among the exemplary data that the mobile coupon system 100 may store on the databases 146 and 182. Customer records may include the basic biographical information discussed above, but may also include information such as a user name, email address, customer credit card number, loyalty program (discussed herein) account number, record of customer purchases, most purchased items, coupons used, etc. Of course, the customer record need not include all of the information above, such as when the mobile coupon system 100 determines some information but does not store it, or stores it someplace other than with the customer record in the database 146 or the database 182. Moreover, the customer record may include additional information not mentioned above.

As shown in FIG. 1B, to access the server 202, the facility servers 126, or the server applications 113, the user executes the client application 266 on one of the internet-enabled devices 206-216, such as the mobile device 212. Using the client application 266, the user may request server data (not shown) by navigating a series of client application screens, such as the home screen 222 of the client application 266. FIGS. 2A, 2B, 3A, 3B, and 4-20 depict client application pages or screens that the server 202, the facility servers 126, or the server applications 113 may transmit in various embodiments of the mobile coupon system 100. In any event, the user may launch the client application 266 from one of the internet-enabled devices 206-216 via any suitable manner, such as touch-selecting a client application icon (not shown) on the display 240 of the mobile device 212 or speaking a voice command into the microphone (not shown) of the tablet computer 206. After the user launches the client application 266, the home screen 222 of the client application 266 is displayed to the user on the mobile device 212.

Figure 2A:
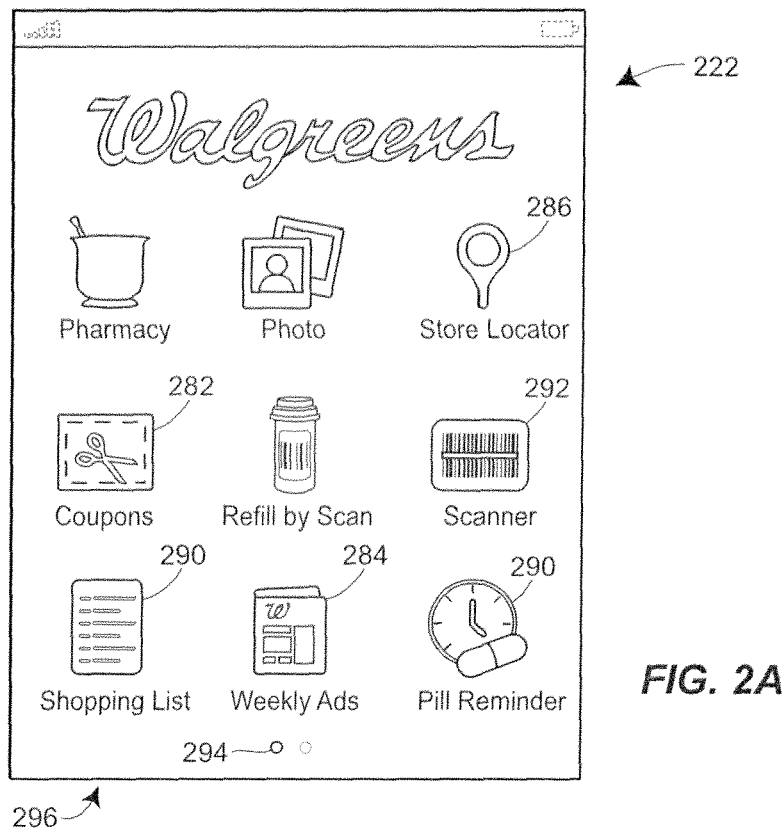
FIG. 2A depicts a home screen of a client application.
Figure 2B:
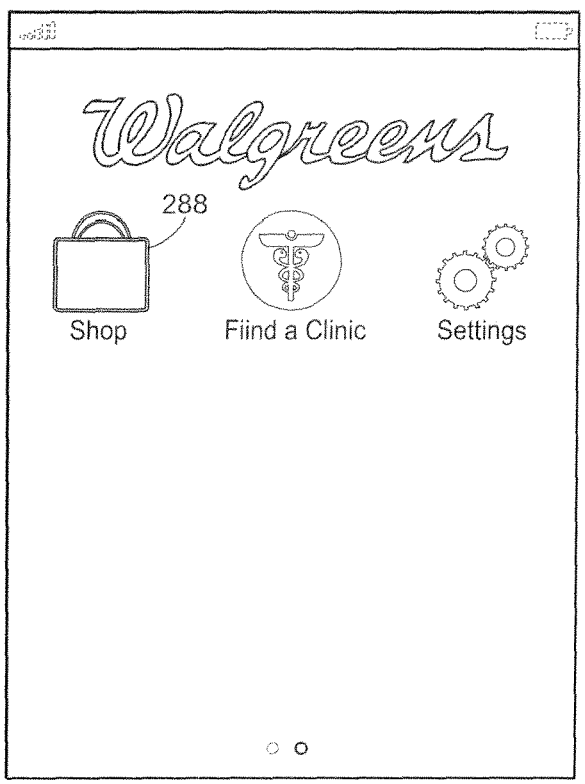
FIG. 2B depicts a second home screen of a client application.

With reference now to FIG. 2A, a first menu page 296 of the home screen 222 of the client application 266, for example, is displayed to the user on the mobile device 212. The home screen 222 may include a "Coupons" icon 282, a "Weekly Ads" icon 284, a "Store Locator" icon 286, a "Shopping List" icon 290, a "Scanner" icon 292, and a menu page indicator 294. In FIG. 2A, the menu page indicator 294 denotes that only the first menu page of the home screen 222 is currently being displayed. The user may input a command (e.g., a touch-swipe on the display 240 of the mobile device 212, a voice command, etc.) to view the second menu page 297 of the home screen 222. With reference now to FIG. 2B, the second menu page 297 of the home screen 222 may display additional links or icons that cannot be accommodated on the first menu page of the home screen 222 (e.g., a user log-in link, a "Shop" icon 288, etc.). In another embodiment, using the client application 266, the user may request and navigate a series of web pages transmitted, preferably in a secure manner (e.g., using Hypertext Transfer Protocol Secure, known as "HTTPS"), by the server 202 to the network-enabled device 206-216. These web pages may be interpreted and displayed via the native browser 270 of the network-enabled device 206-216 or another browser application. It should be understood that it may be desirable for some or all of the data transmitted from the server 202 to the internet-enabled device 206-216, or vice versa, to be encrypted and/or otherwise transmitted in a secure manner.

Figure 3A:
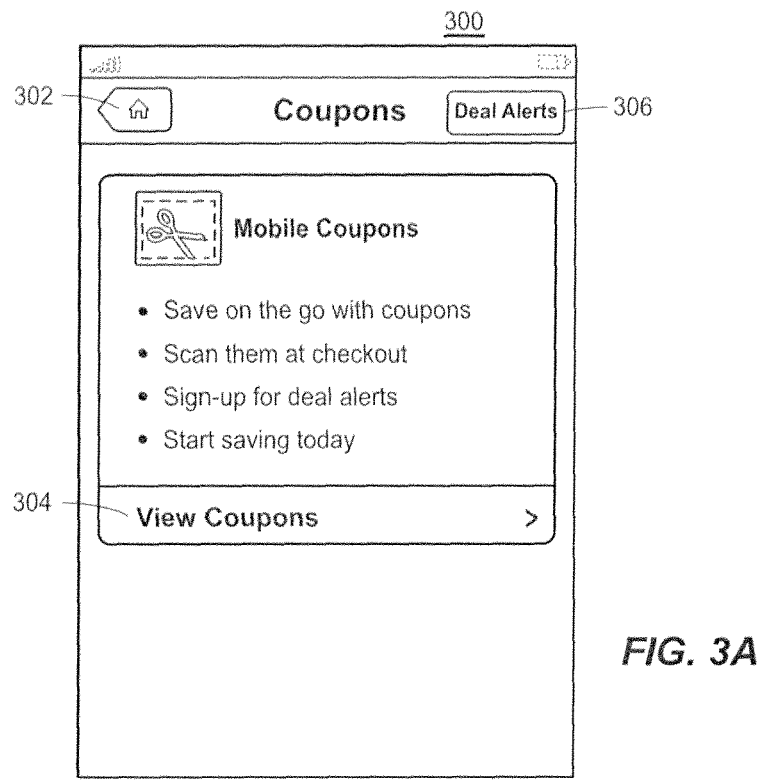
FIG. 3A depicts an embodiment of a first coupon retrieval screen associated with a client application with the present description.
Figure 3B:
FIG. 3B depicts an embodiment of a second coupon retrieval screen associated with a client application with the present description.
Figure 4:
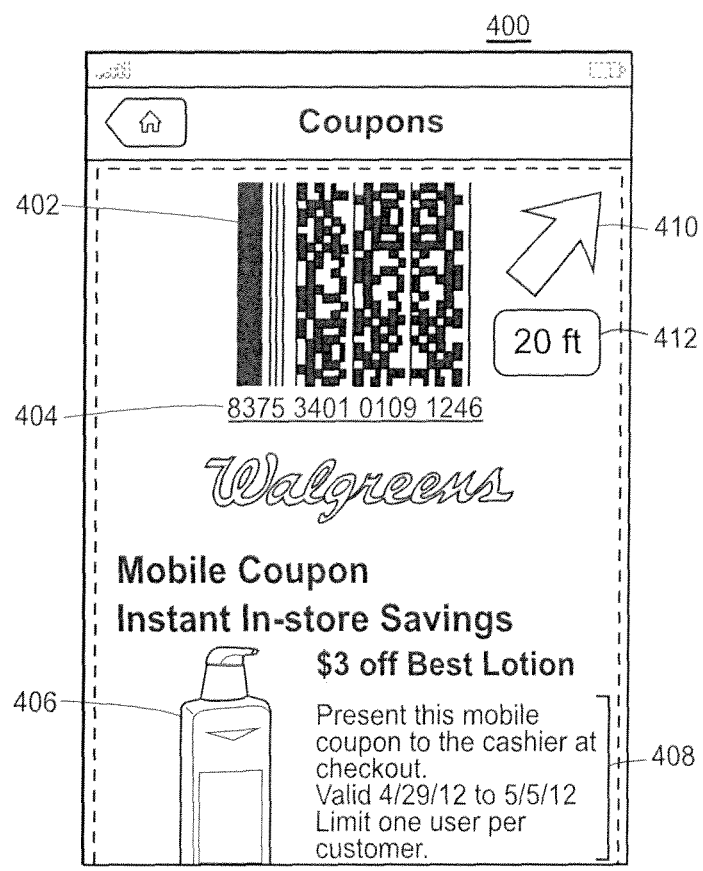
FIG. 4 depicts an embodiment of a coupon display screen associated with a client application with the present description.

From the home screen 222, the user may select the "Coupons" icon 282 to navigate directly to a coupon retrieval screen 300, as shown in FIG. 3A, that may be displayed on the mobile device 212 via the client application 266. The coupon retrieval screen 300 may include a home button 302 that causes the client application 266 to return to the home screen 222. The first coupon retrieval screen 300 may also include a "Deal Alerts" link 306, which when activated causes the client application 266 to prompt the user for information to sign up for automatic alerts (not shown) as discussed herein. The coupon retrieval screen 300 may also include a "View Coupons" link 304 which may be represented on the coupon retrieval screen 300 as a virtual button. When the "View Coupon" link 304 is activated, a coupon list screen 350 may be displayed on the mobile device 212 as shown in FIG. 3B. The coupon list screen 350 may include one or several individual coupon links 308. The individual coupon links 308 may be activated by a user command (e.g., touch command, voice command, etc.). In response to the activation of an individual coupon link 308, a coupon display screen 400, as shown in FIG. 4, may be displayed on the mobile device 212 via the client application 266. The coupon display screen 400 is used to display a code that when entered at the POS terminal 128 triggers the offered coupon deal (for example, $3 off the purchase of lotion as depicted in FIG. 4). With reference to FIG. 4, the code may be represented as a two-dimensional barcode 402 that is a coded representation of information that when scanned by the POS terminal 128 and interpreted by the mobile coupon system 100 (discussed infra) causes the coupon deal to be applied to the customer's purchase. Similarly, a one-dimensional barcode (not shown), or any other symbology could be used as an alternative or in addition to the two-dimensional barcode 402. The coupon display screen 400 may also include a coupon code 404 that can be inputted to the POS terminal 128 manually if for some reason the POS terminal 128 is unable to successfully scan the two-dimensional barcode 402. The coupon code 404 may be represented as a character string consisting of numbers, letters, or other characters. The coupon code 404 is likewise interpreted by the mobile coupon system 100 to cause the coupon deal to be applied to the customer's purchase. The coupon display screen 400 may also include a picture 406 of the good or service to which the coupon applies and a textual description 408 of the terms of the coupon deal being offered (e.g., the offered discount, how to redeem the coupon, limitations on the coupon deal, etc.).

The coupon display screen 400 may further include a heading arrow 410 and a distance 412. In such embodiments, the client application 266 may receive a physical location of the product (e.g., a precise latitude and longitude of the shelf in the store 112 on which the product can be located, etc.) to which the coupon displayed applies. Accessing the GPS unit 244 of the mobile device 212, the client application 266 may determine a product location vector (not shown) comprising a vector heading and a vector distance. The heading is the direction at which the mobile device 212 (and the user holding the mobile device 212) must proceed to reach the shelf at which the physical location of the product to which the coupon applies. This vector heading may be represented as a heading arrow 410 on the coupon display screen 400. The vector distance is the physical distance separating the mobile device 212 from the product location. The vector distance may be represented as a distance 412 on the coupon display screen 400. Of course, other screens such as a shopping list screen 1100, a search results screen 1400, or a browse results screen 1600 (discussed below) may include a heading arrow 410 and a distance 412 in a similar fashion.

While the client application 266 is causing the mobile device 212 to display the coupon display screen 400, the operating system 260 or the client application 266 may also be executing a program or routine to enable the customer to use the mobile device 212 as a method of payment. Additionally or alternatively, the operating system 260 or the client application 266 may provide the capability to use the mobile device 212 as a method of payment at other times. In such embodiments, the mobile device 212 may utilize a near field communication standard (e.g., ISO/IEC 18092, standard provided by the NFC Forum, etc.) to allow the mobile device 212 to engage in short range wireless communication with the POS terminal 128. Such near field communications may allow the mobile device 212 to authorize the POS terminal 128 to charge an account (e.g., a credit card account, a debit card account, or a bank account) linked with the mobile device 212 or client application 266 for the purchase being made with the POS terminal 128. In some embodiments, near field communications may also be used to communicate the code used to trigger the offered coupon deal as an alternative to scanning a barcode or manually entering a number as discussed above.

Figure 5:
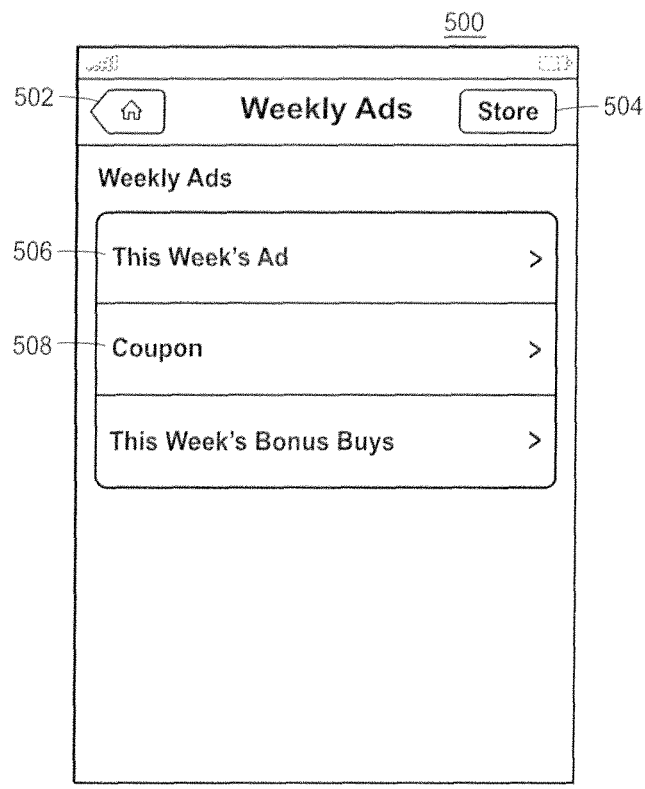
FIG. 5 depicts an embodiment of a weekly ad home screen associated with a client application with the present description.
Figure 6:
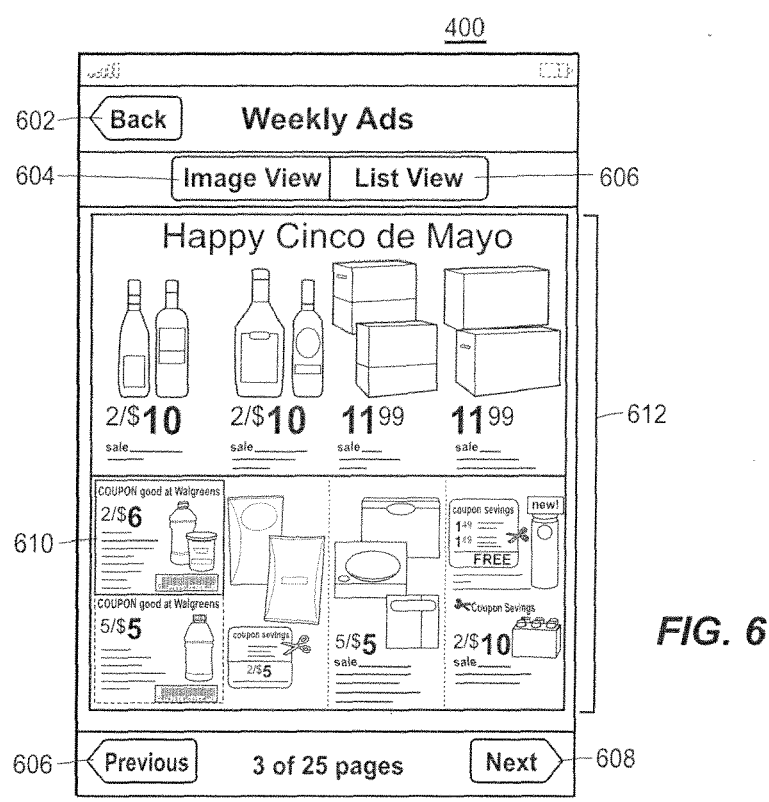
FIG. 6 depicts an embodiment of a weekly ad image view screen associated with a client application with the present description.
Figure 8:
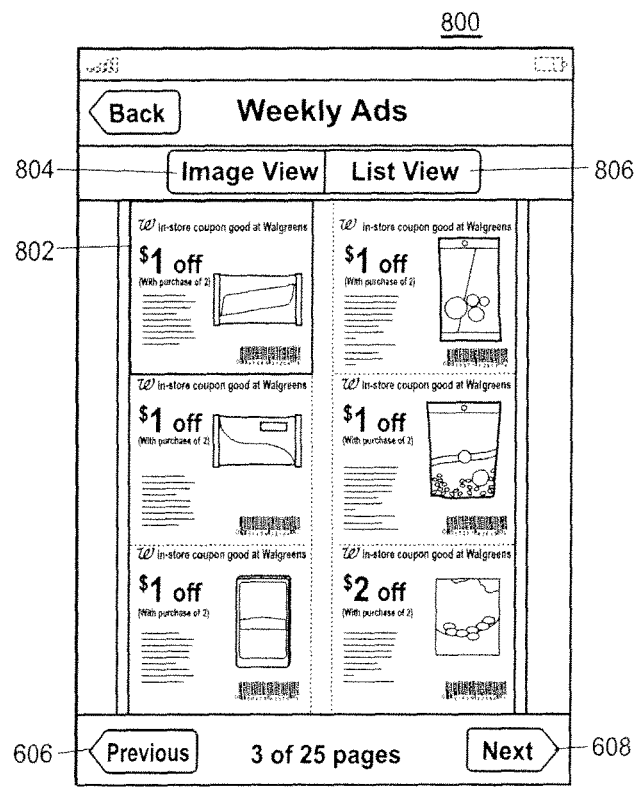
FIG. 8 depicts an embodiment of a weekly ad coupon screen associated with a client application with the present description.

From the home screen 222, the user may select the "Weekly Ads" icon 284 to navigate directly to a weekly ad home screen 500, as shown in FIG. 5, that may be displayed on the mobile device 212 via the client application 266. The weekly ad home screen 500 may include a home button 502 that causes the client application 266 to return to the home screen 222. The weekly ad home screen 500 may include a "Store" link 504 which when activated causes the client applicant 266 to navigate to the store locator screen 900 discussed in FIGS. 9 and 10 discussed infra. The weekly ad home screen 500 may also include a "This Week's Ad" link 506 that the user may select to navigate directly to the weekly ad image view screen 600, as shown in FIG. 6. Additionally, the weekly ad home screen 500 may also include a "Coupon" link 508 that the user may select to navigate to the weekly ad coupon screen 800, as shown in FIG. 8.

Figure 7:
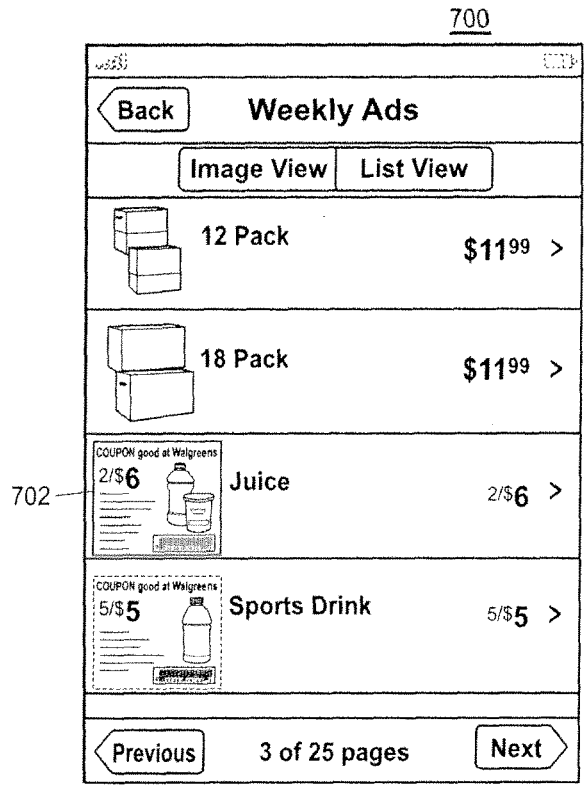
FIG. 7 depicts an embodiment of a weekly ad list view screen associated with a client application with the present description.

Referring again to FIG. 6, the weekly ad image view screen 600 may display a page of a virtual version 612 of a weekly advertisement (not shown) of the kind that was traditionally printed and inserted into the Sunday edition of the local newspaper (not shown). The weekly ad image view screen 600 includes a "Back" button 602 that causes the client application 266 to return to the weekly ad home screen 500. The weekly ad image view screen 600 may further include a set of controls 604 and 606 corresponding to buttons that when activated cause the client application to toggle the display between "Image View," as shown in FIG. 6, where the virtual ad 612 is displayed and "List View," as shown in FIG. 7, where the weekly ad has been broken up into a list of the products represented on that particular page of the weekly ad. Referring again to FIG. 6, the weekly ad image view screen 600 may include a "Previous" button 606 and "Next" button 608 that the user can activate to page through the various pages of the virtual ad 612. In some embodiments, the virtual ad 612 displayed on the weekly ad image view screen 600 may have regions 610 associated with areas of the printed weekly ad that contain coupons that could be clipped from the print version of the weekly add. The user may select the region 610 by using a touch or voice input to cause the coupon to be presented using the coupon display screen 400 as described above. Accordingly, the user may redeem the coupon from the virtual ad 612 at the POS terminal 128 in the manner described infra. Referring now to FIG. 7, the weekly ad list view screen 700 may similarly include a region 702 which can also be selected by the user to cause the coupon to be displayed on the coupon display screen 400. Referring now to FIG. 8, the weekly ad coupon screen 800 may include a virtual representation of the coupons that were presented in the printed weekly ad. As with screens 600 and 700, the weekly ad coupon screen 800 may include a region 802 corresponding to a coupon appearing in the printed weekly ad. The region 802 may be selected by the user to cause a virtual representation of the coupon to be displayed by the coupon display screen 400 which the user can redeem at a POS terminal 128. Additionally or alternatively, the regions 610, 702, 802 may have codes (e.g., a one or two dimensional barcode) that can be directly scanned by the POS terminal 128.

Figure 9:
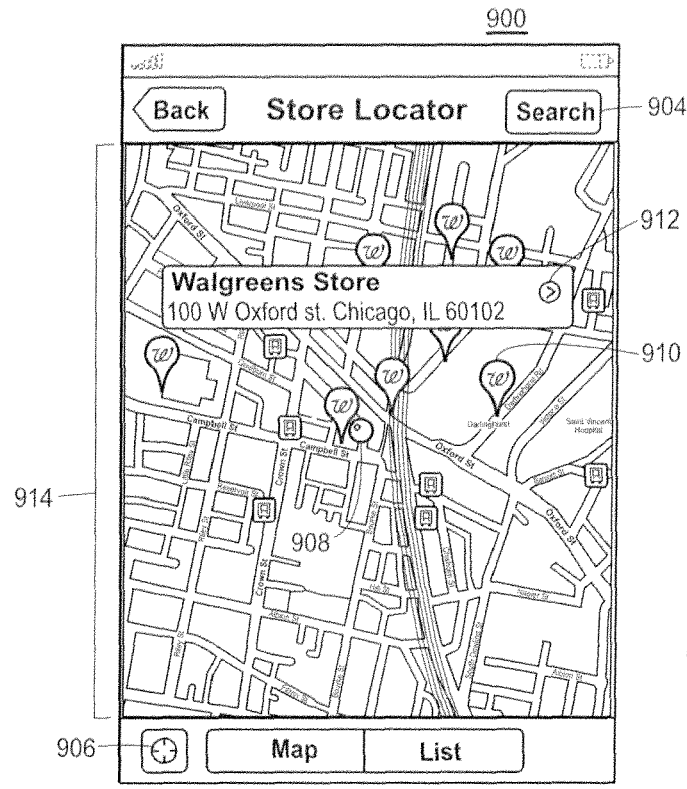
FIG. 9 depicts an embodiment of a store locator map screen associated with a client application with the present description.

From the home screen 222, the user may select the "Store Locator" icon 286 to navigate directly to a store locator map screen 900, as shown in FIG. 9, that may be displayed on the mobile device 212 via the client application 266. The store locator map screen 900 may contain a "home" button 902 that causes the client application 266 to return to the home screen 222. When the client application 266 launches the store locator map screen 900, the client application 266 may access the mobile device 212's GPS unit 244 to determine the location of the user's mobile device 212. Alternatively, the client application 266 may prompt the user with a message requesting the user to enter a location (e.g., an address, a city, a zip code, etc.). Once a location has been established either automatically or through manual user input, the client application 266 may load a map 914 displaying the user's location 908 as well as one or more pharmacies in the immediate vicinity 910. The map 914 may be loaded from a map stored on the mobile device 212 but it may also be transmitted to the mobile device 212 from the server 202 or a third party server, such as a map from a Google® server. The store locator map screen 900 may include a home button 902 that causes the client application 266 to return to the home screen 222. Additionally, the store locator map screen 900 may include a "Search" button which may navigate to a screen (not shown) where the user can manually enter an address to search for nearby stores 112. The store location map screen 900 may also include a current location button 906 which when activated causes the client application 266 to access the mobile device's 212 GPS unit 244 to determine the mobile device's current location. Activating the current location may also cause the client application 266 to re-center the map 914 around the current location 908. When the user selects the location of a store in the vicinity 910 (e.g., by touching the displayed icon), a store address link 912 may be displayed. If the user selects the store address link 912, the client application 266 may navigate to a store locator detail screen 1000, as shown in FIG. 10.

Figure 10:
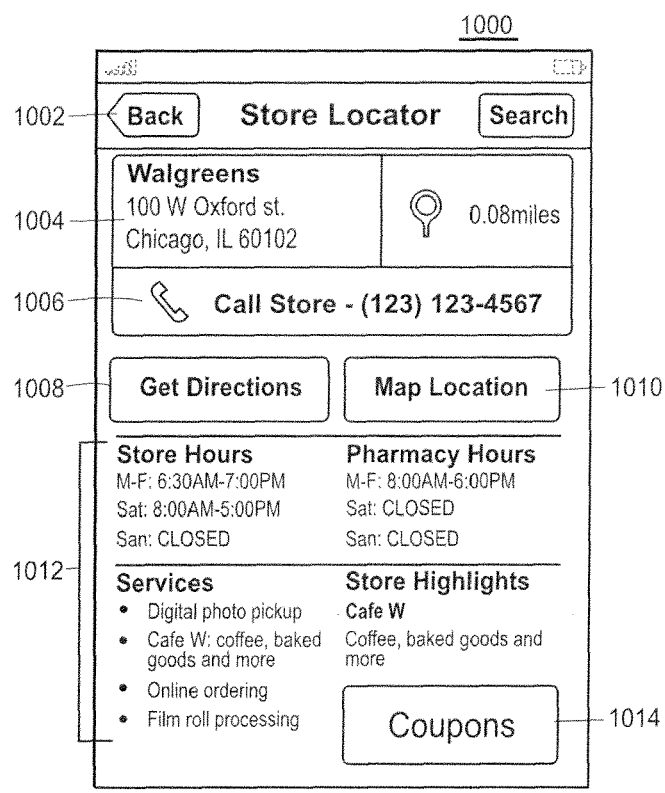
FIG. 10 depicts an embodiment of a store locator detail screen associated with a client application with the present description.

Referring to FIG. 10, the store locator detail screen 1000 may be displayed on the mobile device 212 by the client application 266. The store locator detail screen 1000 includes a "Back" button 1002 that causes the client application 266 to return to the store locator map screen 900. The store locator detail screen 1000 may provide the user with the information about a particular store 112 such as an address 1004, a telephone number 1006, a link to get directions 1008, a link to display the location of the store 112, and general information (e.g., store hours, pharmacy hours, services, etc.) about the store 1012. Additionally, the store locator detail screen 1000 may include a "Back" button that when selected causes the client application 266 to navigate back to the store locator map screen 900. Further, the store locator detail screen 1000 may further include a "Coupons" button 1014 that when activated may cause the mobile device 212 to display one or more virtual coupons that can be redeemed at the specific store 112 referred to by the store locator detail screen 1000. Activating the "Coupons" button 1014 may cause the client application 266 to display on the mobile device a list of coupons (not shown) that are redeemable at any of the stores 112, coupons that are redeemable only at stores 112 within a certain region (e.g., a state, county, metropolitan area, etc.), and/or coupons that are only redeemable at the specific store 112 referred to by the store locator detail screen 1000. The user may select which if any coupons he or she desires to redeem at the POS terminal 128. The coupons may be displayed in a manner previously discussed such as the coupon display screen 400 or a list of coupons similar to the weekly ad coupon screen 800. Additionally or alternatively, if only one coupon is available for redemption at the specific store 112, the client device 266 may immediately display the coupon on a coupon display screen 400 in the manner of FIG. 4 without requiring the user to select the coupon from a list.

Figure 11:
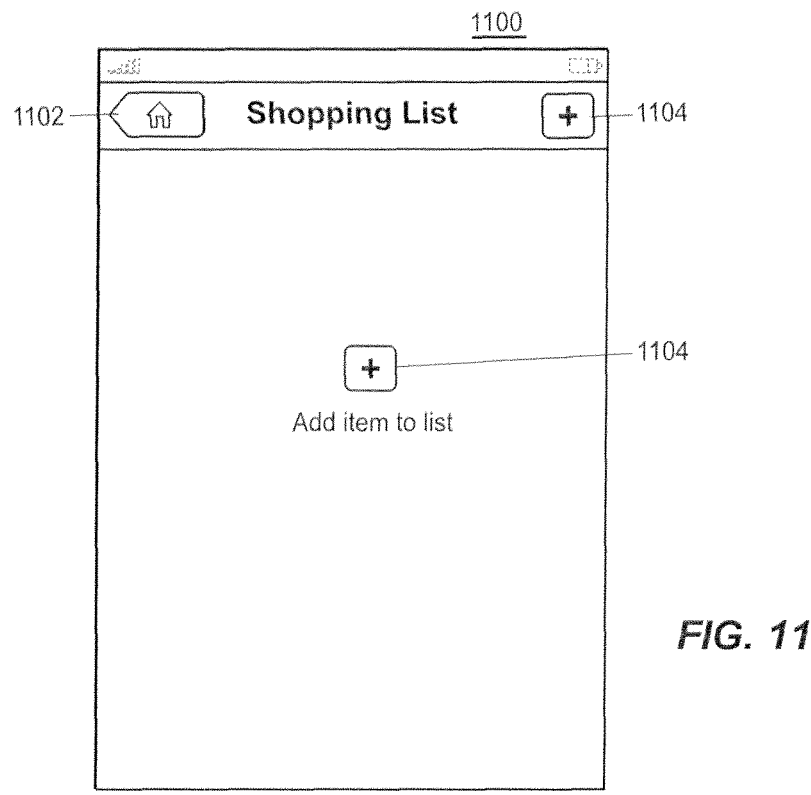
FIG. 11 depicts an embodiment of a first shopping list screen associated with a client application with the present description.
Figure 12:
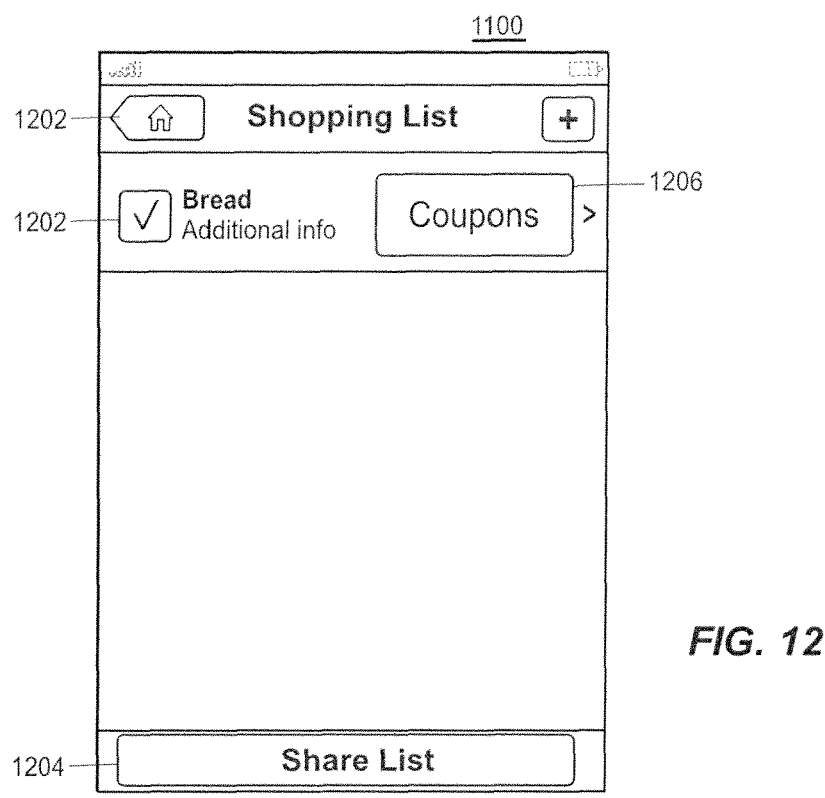
FIG. 12 depicts an embodiment of a second shopping list screen associated with a client application with the present description.

From the home screen 222, the user may select the "Shopping List" icon 290 to navigate directly to a shopping list screen 1100, as shown in FIG. 11, that may be displayed on the mobile device 212 via the client application 266. The shopping list screen 1100 may contain a "home" button 1102 that causes the client application 266 to return to the home screen 222. The shopping list screen 1100 may also include a "Add item to list" button 1104. When the user selects this button 1104 (e.g., by touch or voice input), the client application 266 may display a popup (not shown) on the mobile device 212 prompting the user to input (e.g., by using a keyboard or voice command) an entry on a shopping list. As shown in FIG. 12, the shopping list screen 1100, is displaying an entry 1202 for "Bread" that was entered using the popup. After the user has inputted an entry, the mobile coupon system 100 may execute instructions to analyze the entry to determine if a coupon is available for the type of good or service described in the entry. This analysis, for example, may be accomplished by the mobile device 212 transmitting the content of the entry 1202 to the server 202 which may search the database 146 for a coupon related to the entry. An entry 1202 could contain a general name of a good or service (e.g., "Bread" as shown in FIG. 12) or a specific brand name. Accordingly, the server 202 could search its database 146 (or another data source) for a coupon applying to a member of a general category (e.g., a coupon for a specific brand of bread), a coupon for the specific brand in the entry if present (e.g., a coupon for Coca-Cola®), a coupon for a competing product for the specific brand in the entry if present (e.g., a coupon for Pepsi® or store-brand cola if the entry read "Coca-cola"), or a coupon for a related product (e.g., a coupon for strawberry preserves if the entry is for "Bread" as shown in FIG. 12) etc. The shopping list screen 1100 may include a "Coupons" button 1206 that when activated may cause the mobile device 212 to query the mobile coupon system 100 for and display one or more virtual coupons. The coupons may be displayed in a manner previously discussed such as the coupon display screen 400 or a list of coupons similar to the weekly ad coupon screen 800. Additionally, the shopping list screen 1100 may include a "Share List" button 1204 that when activated by the user causes the client application 266 to display a pop-up (not shown) to ask the user if he or she would like to send the list in an email or post the shopping list to a social network site (e.g., Facebook®, Twitter®, Tumblr®, etc.). If the user elects to email the list, the client application 266 may launch the mobile device's 212 email application (not shown) to send the list in an email. If the user elects to post the list to a social network, the client application 266 may transmit a web request to a social network website to post the list to the user's social network account (not shown).

Figure 13:
FIG. 13 depicts an embodiment of a shop screen associated with a client application with the present description.
Figure 14:
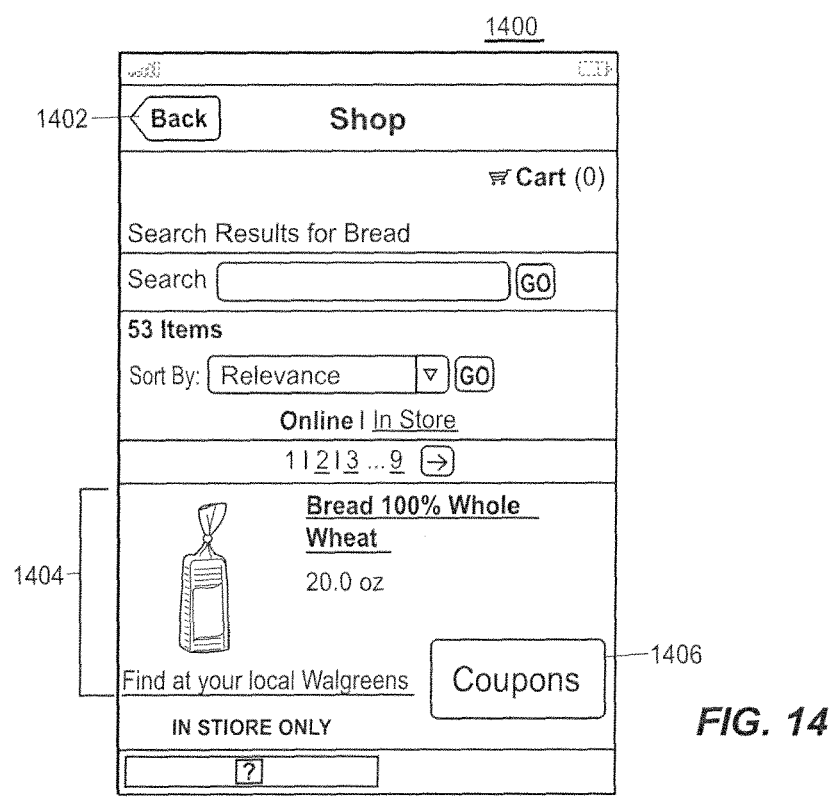
FIG. 14 depicts an embodiment of a search results screen associated with a client application with the present description.
Figure 15:
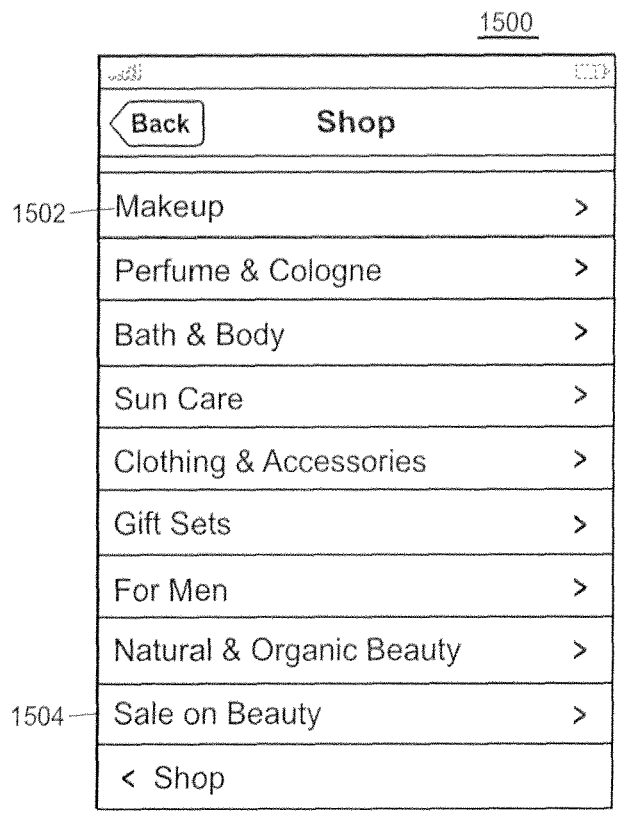
FIG. 15 depicts an embodiment of a shop category screen associated with a client application with the present description.
Figure 16:
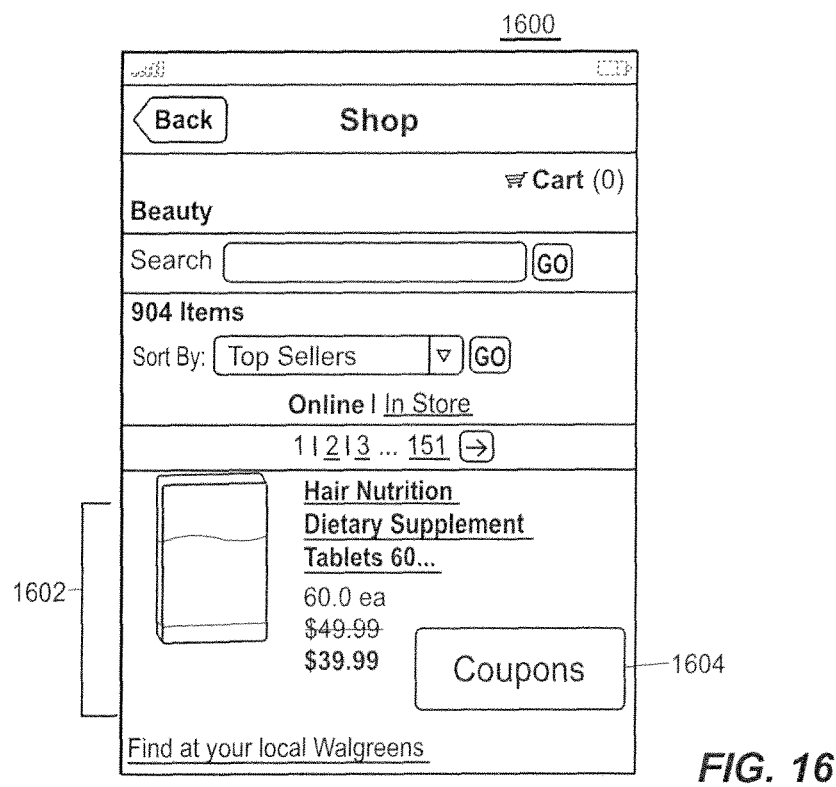
FIG. 16 depicts an embodiment of a browse results screen associated with a client application with the present description.

From the home screen 222, the user may select the "Shop" icon 288 to navigate directly to a shop screen 1300, as shown in FIG. 13, that may be displayed on the mobile device 212 via the client application 266. The shop screen 1300 may contain a "home" button 1302 that causes the client application 266 to return to the home screen 222. The shop screen 1300 may include a search field 1304. Using the search field 1304 and the input capabilities of the mobile device (e.g., a hard or soft keyboard, voice command, etc.), the user may search for a specific item (e.g., Coca-Cola®) or a general type of item (e.g., bread) for a variety of reasons. FIG. 14 shows a search results screen 1400 that was generated after the user searched for "bread." The search results screen 1400 may a "Back" button 1402 that when selected causes the client application 266 to navigate back to the shop screen 1300. The search results screen 1400 may display a search result entry 1404 displaying information about whether the searched for product is available at one or more stores 112, what the price of the product is, a photograph of the product, etc. If one or more coupons is available, the search results screen 1400 may include a "Coupon" button 1406 that when activated may cause the mobile device 212 to display one or more virtual coupons. The coupons may be displayed in a manner previously discussed such as the coupon display screen 400 or a list of coupons similar to the weekly ad coupon screen 800. Referring again to FIG. 13, the user may also browse through products by category by activating a category link 1306. Activating the category link 1306 may cause a shop category screen 1500 to be displayed on the mobile device 212 by the client application 266. The shop category screen 1500 may include one or more sub-category links 1502 as well as a sale category link 1504, as shown in FIG. 15. Activating either link 1502 or 1504 may cause the client application 266 to navigate to a browse results screen 1600, as shown in FIG. 16, similar to the search results screen 1400. The browse results screen 1600 may display a browse result entry 1602 displaying information about whether the browsed to product is available at one or more stores 112, what the price of the product is, a photograph of the product, etc. If one or more coupons is available pertaining to the product, a related product, or a competing product, the browse results screen 1600 may include a "Coupon" button 1604 that when activated may cause the mobile device 212 to display one or more virtual coupons. The coupons may be displayed in a manner previously discussed such as the coupon display screen 400 or a list of coupons similar to the weekly ad coupon screen 800.

Figure 17:
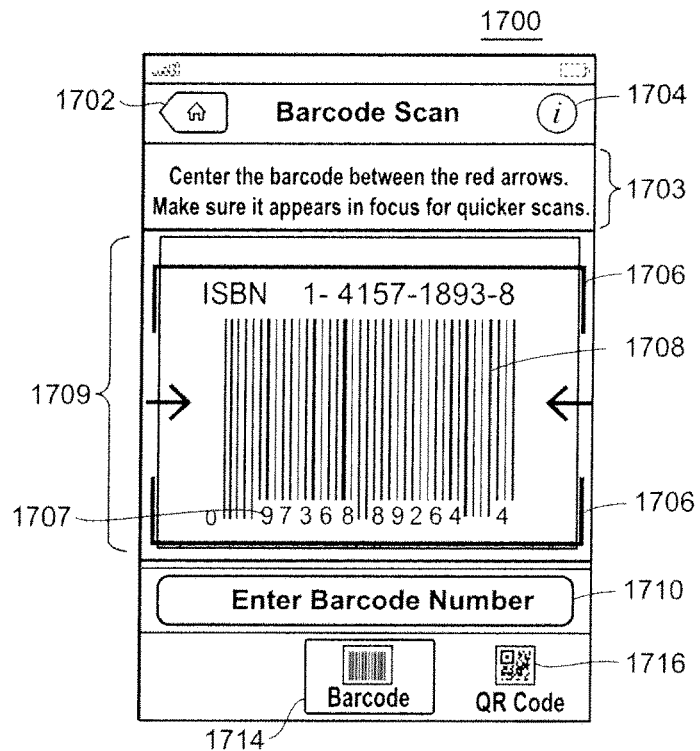
FIG. 17 depicts an embodiment of a first image capture screen associated with a client application with the present description.

It may be advantageous that from the home screen 222, the user may select the "Scanner" icon 292 to navigate directly to an image capture screen 1700 for a linear barcode type (e.g., UPC barcode type), as shown in FIG. 17, that may be displayed on the mobile device 212 via the client application 266. The image capture screen 1700 may include a home button 1702 that causes the client application 266 to return to the home screen 222. An instructional message 1703 may provide directions of use that assist the user in properly scanning a UPC barcode 1708. An information button 1704 may cause the client application 266 to display instructions associated with the mobile coupon system 100, or cause the native web browser 270 of the mobile device 212 to navigate to a web page containing such instructions. The image capture screen 1700 also includes an image capture area 1709, which may include the area indicated between a pair of frame marks 1706 on the display. The size and spacing of the image capture area 1709 may be customized to a particular barcode type; for example, the pair of frame marks 1706, as shown in FIG. 17, are specifically spaced apart and sized to frame the length and width ratio of the standard UPC barcode 1708. Moreover, the UPC barcode 1708 includes a product barcode number 1707 that is associated with the UPC barcode 1708 and associated with a unique product. Aligning the UPC barcode 1708 in the image capture area 1709 between the frame marks 1706 may cause the client application 266 to capture and/or interpret the UPC barcode 1708. Alternatively, a button (not shown), when activated by a user, may cause the image capture device 256 in the mobile device 212, to capture the UPC barcode 1708 image. If the UPC barcode 1708 is captured or interpreted successfully, the client application 266 may display a screen with a success message (not shown). If the UPC barcode 1708 is not captured or interpreted successfully or if the user wishes to manually enter the UPC barcode 1708, the user may select an "Enter Barcode Number" selector icon 1710 to manually enter the UPC barcode number.

Figure 18:
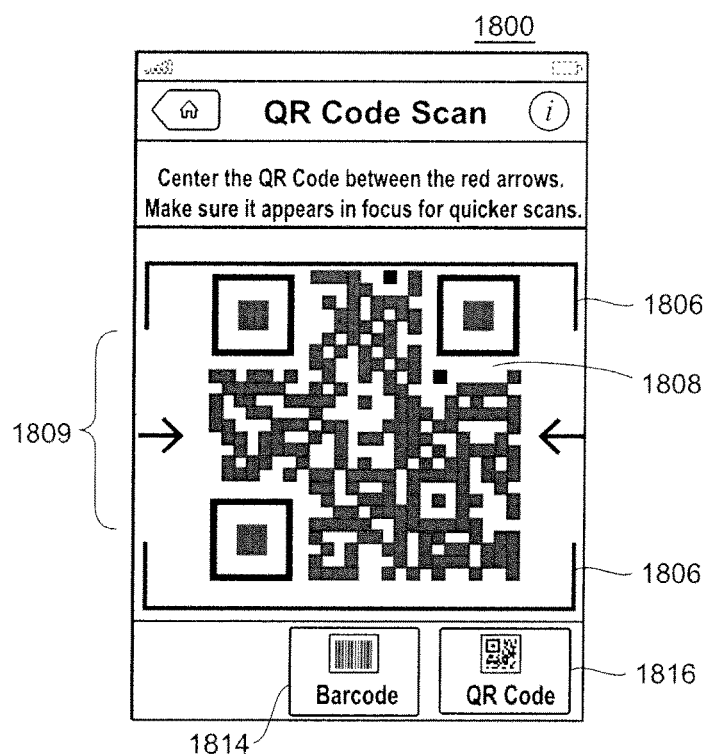
FIG. 18 depicts an embodiment of a second image capture screen associated with a client application with the present description.

The image capture screen 1700 for the UPC barcode 1708 may also include a "Prescription" overlay selector icon 1712, a "Barcode" overlay selector icon 1714, and a "QR Code overlay selector icon 1716. Because the user arrived at the image capture screen 1700 for the UPC barcode 1708 via the "Scanner" icon 292 of the home screen 222 (as shown in FIG. 2A), the "Barcode" overlay selector icon 1714 may be pre-selected, as denoted by a box or a highlighted color. If the user wishes to view a QR Code barcode type overlay, the user may select the "QR Code" overlay selector icon 1716 to navigate to an image capture screen 1800 for a matrix barcode type (e.g., a QR Code barcode type, etc.). The image capture screen 1800 for a matrix barcode type, as shown in FIG. 18, includes similar features as the image capture screen 1700 for the UPC barcode 1708 (the UPC barcode 1708 overlay) in FIG. 17. For example, the image capture screen 1800 of FIG. 18 includes an image area capture area 1809 and framing marks 1806 to frame a QR Code barcode 1808. As shown in FIG. 18, the pair of framing marks 1806 is specifically spaced apart and sized to frame the length and width ratios of a standard QR Code barcode 1808. Aligning the QR Code barcode 1808 in the image capture area 1809 that resides between the framing marks 1806 may cause the client application 266 to capture and/or interpret the QR Code barcode 1808. Alternatively, a button (not shown), when activated by a user, may cause the image capture device 256 in the mobile device 212, to capture the QR Code barcode 1808 image. If the QR Code barcode 1808 is captured or interpreted successfully, the client application 266 may display a screen with a success message (not shown). Of course, the disclosure herein is not intended to limit the client application 266 to only two image capture screens, but rather, the mobile coupon system 100 may utilize any number of image capture screens for any number of different symbologies.

Of course, the user may navigate to any overlay type of an image capture screen 1700, 1800 from any other overlay type of an image capture screen 1700, 1800. In some embodiments, the purpose of the overlay types of the image capture screens 1700, 1800 is merely to assist the user in scanning a barcode of various barcode types and to make the user aware of the various barcode types available. The mobile coupon system 100 does not necessarily utilize the overlay type of the image capture screen 1700, 1800 in scanning or in interpreting the barcode type of the barcode 1708, 1808. Rather, the system 100 independently recognizes or determines the barcode type from the captured barcode 1708, 1808, regardless of the selected overlay type of the image capture screen 1700, 1800. For example, from the image capture screen 1700 for the UPC barcode illustrated in FIG. 17, the user may attempt to capture the QR Code barcode 1808 illustrated in FIG. 18, and the mobile coupon system 100 would properly and independently recognize the barcode 1808 as a QR Code barcode type, despite the user utilizing the image capture screen 1700 for the UPC barcode and the "Barcode" overlay selector icon 1712 being selected. Independently determining a barcode type is beneficial in that the user may incorrectly or mistakenly select the inappropriate barcode type via the selector icons (e.g., the "Prescription" overlay selector icon 1712, the "Barcode" overlay selector icon 1714, the "QR Code" overlay selector icon 1716, etc.). Thus, neither the user's manner of entry in navigating to one of the image capture screens 1700, 1800 nor the user's selection of overlay selector icons 1712, 1714, 1716 affects the determination of the barcode type from the barcode 1708, 1808.

Figure 19:
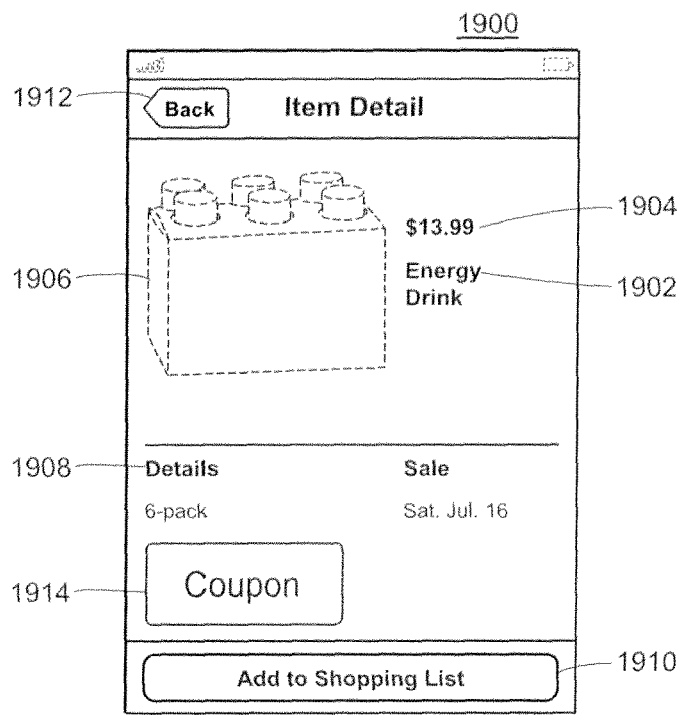
FIG. 19 depicts an embodiment of a product information screen associated with a client application with the present description.

In any event, referring back to FIG. 17, if the UPC barcode 1708 is captured or interpreted successfully, client application 266 retrieves product information data (described below) associated with the UPC barcode and displays the product information data to the user. As shown in FIG. 19, the system 100 may display the product information data in a product display screen 1900 within the client application 266 on the network-enabled device 206-216. The product information data may include a name of the product 1902, a price of the product 1904, an image of the product 1906, and any other additional pertinent or specific details 1908 (e.g., sale information, etc.) that relate to the product. If one or more coupons is available pertaining to the product, a related product, or a competing product, the product display screen 1900 may include a "Coupons" button 1914 that when activated may cause the mobile device 212 to display one or more virtual coupons. The coupons may be displayed in a manner previously discussed such as the coupon display screen 400 or a list of coupons similar to the weekly ad coupon screen 800. In some embodiments, the user may purchase the product by selecting the "Add to Shopping List" selector icon 1910. In other embodiments, if the user is not interested in the product, the user may select the "Back" selector icon 1912 to return to the image capture screen 1700 for the UPC barcode 1708 of FIG. 17.

Figure 20:
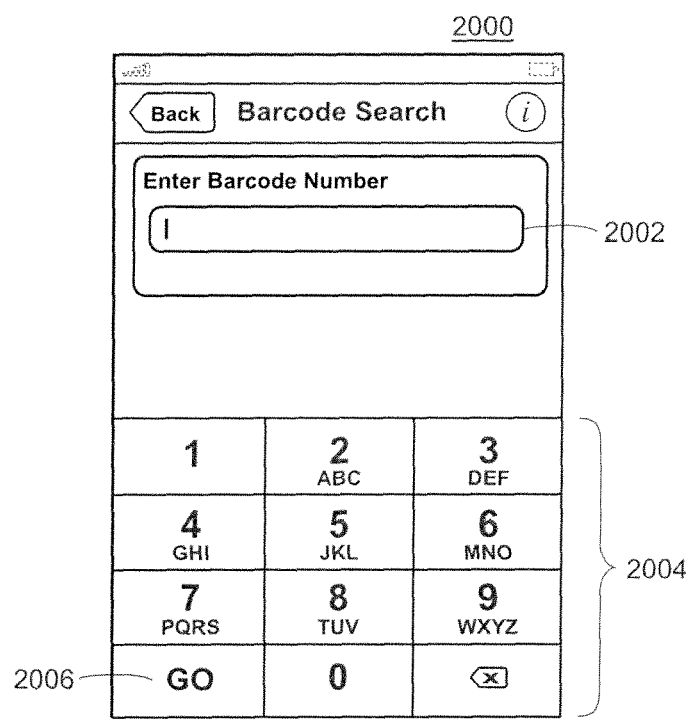
FIG. 20 depicts an embodiment of a manual barcode entry screen associated with a client application with the present description.

Referring back to FIG. 17, a manual entry button 1710 for the product barcode 1708 alternatively allows the user to input a product barcode number 1707 manually, instead of automatically capturing and interpreting the UPC barcode 1708. Manual entry may be useful in instances when the image capture device 256 fails to operate, when the product barcode 1708 is corrupted and a proper scan is not possible, in bad lighting, etc. When the user selects the button 1710, the client application 266 may display a product barcode search screen 2000, as shown in FIG. 20, for manually entering the product barcode or UPC code number 1707. The user may select each number of the product barcode or UPC code number 1707 using a keypad 2004 while the system displays each number in a barcode field 2002. The user then may select the "GO" selector icon 2006 to initiate a product barcode search. Of course, the selector icon 2006 need not be labeled "GO," but could instead have any appropriate label (e.g., "Enter," "Accept," etc.). If the manually entered product barcode number 1707 is successfully accepted, the user may be redirected to the product display screen 1900 of FIG. 19.

Figure 21:
FIG. 21 depicts an embodiment of a mobile device lock screen associated with a client application with the present description.

FIG. 21 shows a mobile device lock screen 2100. The operating system 260 of the mobile device 212 may display the mobile device lock screen 2100 on the display 240, for example, in response to a user command or after certain amount of time since the user's last command. As is known, a mobile device lock screen 2100 can be used to prevent unintentional usage of the mobile device 212 such as when the mobile device 212 is being stored in a user's purse (not shown) or carried in a pocket (not shown). It is further known that a mobile device lock screen 2100 can also be used to display various alerts to inform the user of something. Accordingly, the client application 266 may execute to cause a coupon alert notification 2102 to be displayed on the screen 240 of the mobile device 212. The client application 266 may cause the coupon alert notification 2102 to be displayed for a number of reasons discussed herein and in FIG. 23. The mobile device lock screen 2100 may also include a "View" button 2104 which when activated causes the client application 266 to navigate to the coupon display screen 400. Additionally, the mobile device lock screen 2100 may also include an unlock control 2106 which may be activated to navigate to a display of all of the coupons that are available for redemption or to the coupon display screen 400 as configured by user preferences stored in data storage 262.

Figure 22:
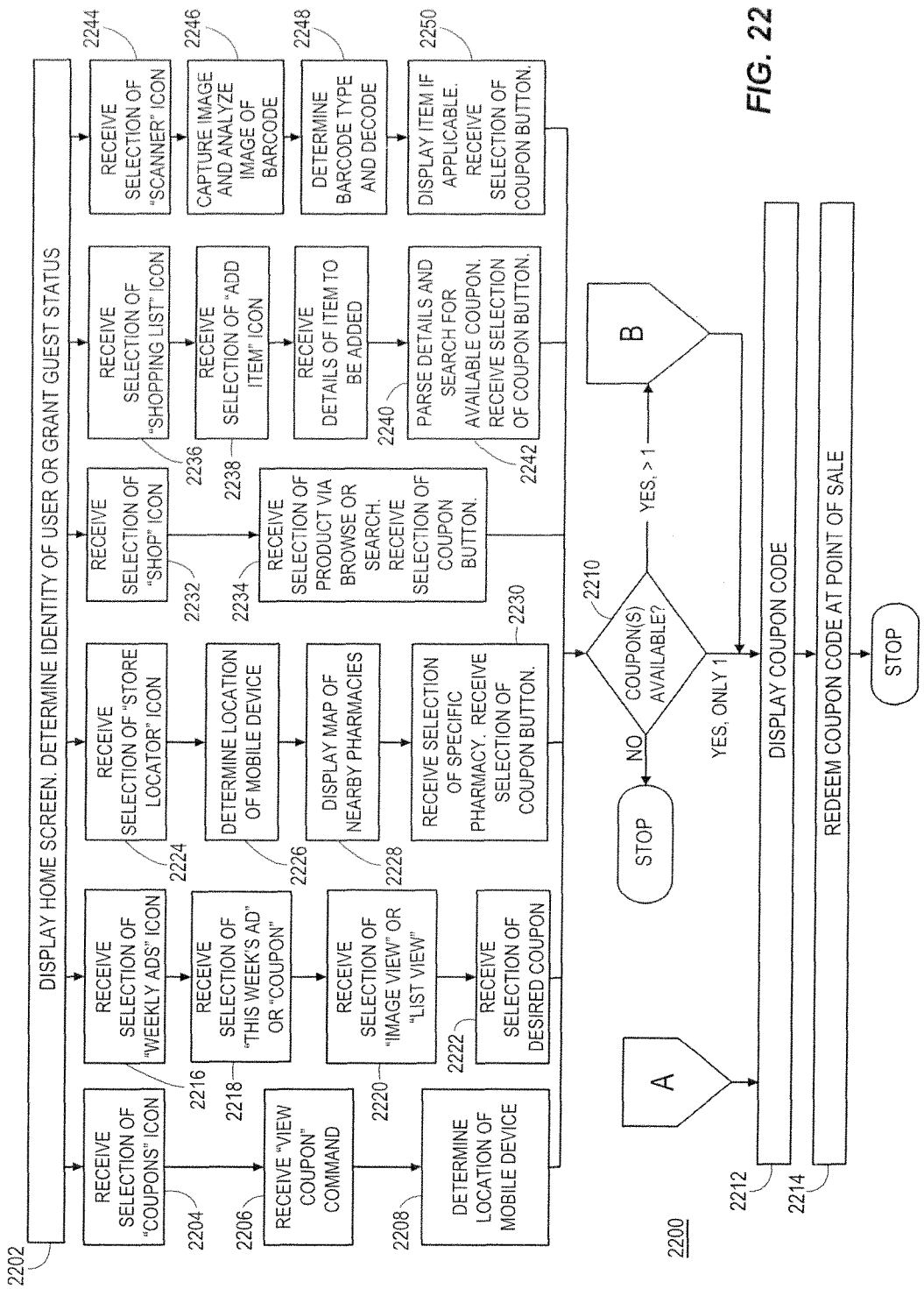
FIG. 22 illustrates an exemplary client-side method for implementing the mobile coupon system in accordance with the presently described embodiments.

FIG. 22 is a flow diagram depicting an exemplary embodiment of a mobile coupon method 2200 implemented by the mobile coupon system 100. Generally speaking, the mobile coupon method 2200 includes receiving a command from the user to execute an instance of the client application 266, and the client application 266 executes to display the home page 222 (block 2202), as shown in FIG. 2A, to the user via the display 240 of the mobile device 212. The client application 266 may also determine the identity of the user (e.g., by using a user login username and password, by using a unique identifier associated with the mobile device, etc.) or may grant the user guest status if the user has not or cannot be identified. Identifying the user may give the client application 266 the ability to tailor the user's experience (e.g., by allowing the user to rearrange the placement of the icons displayed on the home screen) and/or the ability to tailor the coupons displayed to the user's preferences (e.g., displaying coupons corresponding to stores 112 in the user's vicinity, displaying coupons for products and services to which the user has defined a preference). Once the user's identity is determined or guest status is granted, the client application 266 may wait to receive a command or selection. The client application 266 may receive a selection of the "Coupons" icon 282 (block 2204), receive a selection of the "Weekly Ads" icon 284 (block 2216), receive a selection of the "Store Locator" icon 286 (block 2224), receive a selection of the "Shop" icon 288 (block 2232), receive a selection of the "Shopping List" icon 290 (block 2236), receive a selection of the "Scanner" icon 292 (block 2244), receive other commands, etc.

Having received a selection of the "Coupons" icon 282 (block 2204), the client application 266 may then display the coupon retrieval screen 300 and receive a "View Coupon" command (i.e., the user activates the "View Coupon" link 304) (block 2206). The client application 266 may access the GPS unit 244 of the mobile device 212 to determine the location of the mobile device 212 (block 2208).

The mobile coupon system 100 determines whether any coupon(s) are available (block 2210). More particularly, the client application 266 of the mobile device 212 may communicate through the network 130 with the server application 238 on the server 202 to request that the mobile coupon system 100 send a list of available coupons (not shown). The server 202 may have a list of available coupons stored locally (e.g., in the database 239), or the server 202 may communicate through the network 130 with the central processing system 140 to determine whether any coupons are available (e.g., whether information about the availability of coupons is stored on the central processing system 140). Additionally or alternatively, the client application 266 could communicate with the central processing system 140 directly to determine if any coupons are available. If no coupons are available or if the client application 266 was unable to communicate with either the server 202 or the central processing system 140, the system may inform the user by displaying an error message (not shown). If only one coupon is available, the server 202 may send coupon content (e.g., a two-dimensional barcode 402, a coupon code 404, picture 406, textual description 408, the location of the product to which the coupon applies) to the client application 266 to display on the coupon display screen 400 (block 2212). After receiving the coupon content, the client application 266 may assemble the coupon display screen 400 by arranging the coupon content into the coupon display screen 400. Of course, the coupon content can be arranged in any other way layout on the coupon display screen 400 (e.g., the two-dimensional barcode 402 could be arranged underneath the picture 406, etc.). Alternatively, the client application 266 may receive the coupon display screen 400 from the server 202 already arranged such that the client application 266 merely displays the received coupon display screen 400 on the display 240 (i.e., the mobile device 212 does not have to do any processing other than the processing required to drive the display 240). Receiving an already arranged coupon display screen 400 may be advantageous especially if the network-enabled device 206-216 is a thin-client device 216 that relies on the server 202, the central processing system 140, or another computer to perform most of its traditional computing functions (i.e., arranging various data objects for display). After displaying the coupon on the display 240, the user or a cashier assisting the user may scan the coupon barcode 402, manually enter the coupon code 404, or otherwise input coupon information into the POS terminal 128 to redeem the coupon (block 2214). If the coupon is successfully redeemed by the mobile coupon system 100, the user may receive the discounted price or other special deal offered with the coupon.

Figure 24:
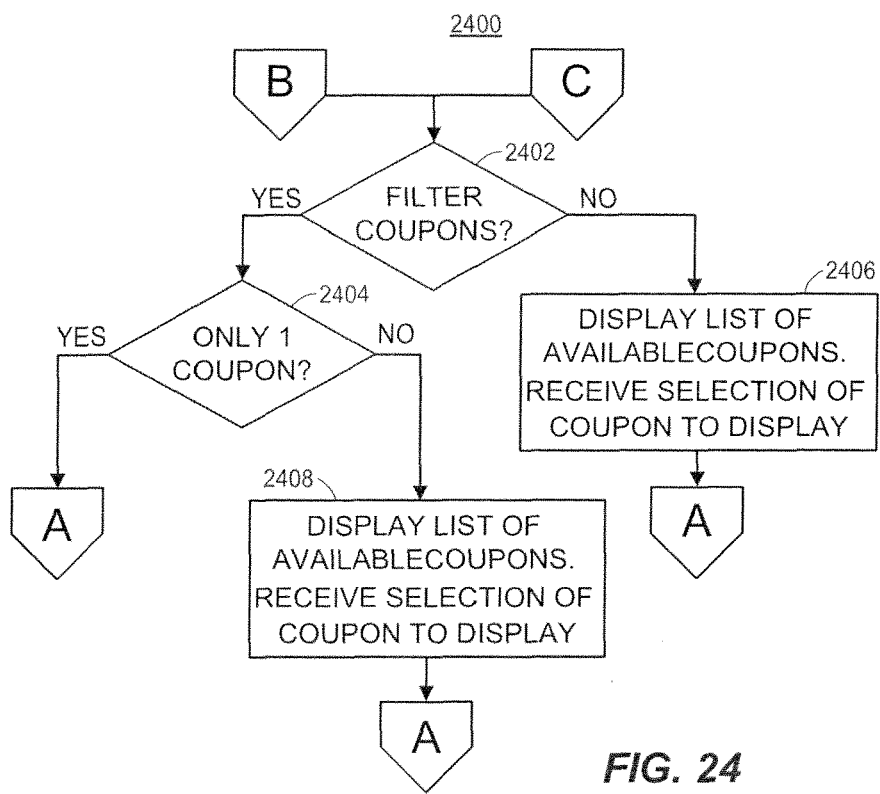
FIG. 24 illustrates an exemplary multiple coupon filtering method for implementing the mobile coupon system in accordance with the presently described embodiments.

If the mobile coupon system 100 determines that more than one coupon is available, the system 100 may decide which coupon or coupons to display as shown in FIG. 24. This determination may be performed by either or both by the front-end components 102 (e.g., the mobile device 212 receives many electronic coupons and selects which to display to the user based on filters discussed below) or back-end components 104 (e.g., the central processing system 140 or server 202 filters selects which electronic coupons to send to the mobile device 212). FIG. 24 is a flow diagram depicting an exemplary embodiment of a multiple coupon filtering method 2400 implemented by the mobile coupon system 100. The method 2400 may apply one or more filters a list of the coupons that are available on the mobile coupon system 100 (block 2402). One filter may be a filter based on the location of the mobile device (e.g., the state, city, or store region in which the device is currently located). Another filter may be a filter based on the relative proximity to stores 112 at which certain coupons are redeemable and the relative proximity to stores 112 at which those coupons are not redeemable (e.g., if a coupon is only redeemable at a store 30 miles away, the filter might exclude that coupon). Still another filter may be based on the location of the mobile device inside the store 112 (e.g., if the GPS unit 244 of the mobile device 212 indicates the mobile device 212 just left the vitamin aisle and entered the beauty aisle of the store 112, the filter may exclude coupons for vitamins and promote coupons for makeup). Each of these location-based filters may be configured to ensure that coupons with redemption locations that are more proximate pass through the filter while coupons with less proximate redemption locations do not pass the filter. Another filter may be based on the user profile and/or purchase history of the user stored on the mobile device 212, server 202, or the central processing system 140 (e.g., if the user profile indicates that the user is female and has never purchased a vitamin, the filter may exclude a coupon for a multi-vitamin formulated for men). Another filter may be based on the category of the item to which the coupon applies and user preference (e.g., the user has specified that he is not interested in coupons for candy). Of course, other filters may be applied to the list of available coupons. If filters are applied, the method 2400 may determine if only one coupon remains (block 2404). If only one coupon remains, the multiple coupon filtering method 2400 may return the mobile coupon method 2200 and display the coupon on the display 240 as discussed above (block 2212). If no filters are applied or if more than one available coupon passes the filters that were applied, the client application 266 may execute instructions to display the list of available coupons on the display 240 in a coupon list screen 350 (blocks 2406 and 2408, respectively). The client application 266 may received a user command (e.g., touch command, voice command, etc.) in response to the coupon list screen 350 to select a single coupon to display. When a selection of a single coupon to display is received, the multiple coupon filtering method 2400 may return the mobile coupon method 2200 and display the coupon on the display 240 as discussed above (block 2212).

Having received a selection of the "Weekly Ads" icon 284 (block 2216), the client application 266 may then display the weekly ad home screen 500, as shown in FIG. 5, on the display 240 (block 2218). The method 2200 may then receive a selection of the "This Week's Ad" link 506 or the "Coupon" link 508 displayed on the weekly ad home screen 500 (block 2218). According to the selection received, the client application 266 may execute instructions to display the weekly ad image view screen 600 or weekly ad coupon screen 800, respectively (block 2220). The method 2200 may then receive a selection of the "Image View" links 604 or 804 or receive a selection of the "List View" links 606 or 806 (block 2220). Displaying either the weekly ad image view screen 600, the weekly ad list view screen 700, the weekly ad coupon screen 800, the method 2200 may then receive a selection of the desired coupon (block 2222). The method 2200 then determines whether the desired coupon is available (block 2210), displays the coupon if available (block 2212), and the user redeems the coupon at the POS terminal 128 (block 2214) as described above.

Having received a selection of the "Store Locator" icon 286 (block 2224), the client application 266 may then display the store locator map screen 900, as shown in FIG. 9, on the display 240 (block 2226). The client application 266 may then access the mobile device 212's GPS unit 244 to determine the location of the user's mobile device 212 (block 2226). Alternatively, the client application 266 may prompt the user with a message requesting the user to enter a location (e.g., an address, a city, a zip code, etc.) (block 2226). Once a location has been established either automatically or through manual user input, the client application 266 may load a map 914 displaying the user's location 908 as well as icons representing one or more pharmacies in the immediate vicinity 910 (block 2228). The map 914 may be loaded from a map stored on the mobile device 212 but it may also be transmitted to the mobile device 212 from the server 202 or a third party server, such as a map from a Google® server. When the user selects the location of a store in the vicinity 910 (e.g., by touching the displayed icon), a store address link 912 may be displayed (block 2230). If the user selects the store address link 912, the client application 266 may navigate to a store locator detail screen 1000, as shown in FIG. 10. The method 2200 may then receive a selection of the "Coupons" button 1014 (block 2230). The method 2200 then determines whether coupons are available (block 2210), filters coupons (FIG. 24), displays the desired coupon if available (block 2212), and the user redeems the coupon at the POS terminal 128 (block 2214) as described above.

Having received a selection of the "Shop" icon 288 (block 2232), the client application 266 may then display the shop screen 1300, as shown in FIG. 9, on the display 240 (block 2234). Using the search field 1304 and the input capabilities of the mobile device (e.g., a hard or soft keyboard, voice command, etc.), the user may search for a specific item (e.g., Coca-Cola®) or a general type of item (e.g., bread) for a variety of reasons. Alternatively, the user may browse for an item using the category link 1306, the shop category screen 1500, the sub-category links 1502, and/or the sale category link 1504. With the use having found an product either be searching or browsing, the method 2200 may receive a selection of the product and a selection of the "Coupon" button 1406 or 1604, respectively. The method 2200 then determines whether coupons are available (block 2210), filters coupons (FIG. 24), displays the desired coupon if available (block 2212), and the user redeems the coupon at the POS terminal 128 (block 2214) as described above.

Having received a selection of the "Shopping List" icon 290 (block 2236), the client application 266 may then display the shopping list screen 1100, as shown in FIG. 11, on the display 240 (block 2234). The method 2200 may then receive the selection of the "add item to list" button 1104 (block 2238). Next, the method 2200 may receive the details of the item to be added to the shopping list (e.g., a general category such as "bread" or a specific item such as "Coca-Cola®) (block 2240). Having received the details of the item to be added, the mobile coupon system 100 may parse the details to look for keywords or other indicators that can be used by the server 202 to search its database 239 or the central processor's database 146 and/or the central processing system 140 to search its database 146 for coupons that may be directly applicable, related to, or competing with products listed on the shopping list (block 2242). The method 2200 may then receive a selection of the "Coupon(s)" button 1206. The method 2200 then determines whether coupons are available (block 2210), filters coupons (FIG. 24), displays the desired coupon if available (block 2212), and the user redeems the coupon at the POS terminal 128 (block 2214) as described above.

Having received a selection of the "Scanner" icon 292 (block 2244), the client application 266 may then display the image capture screen 1700, as shown in FIG. 17, on the display 240 (block 2246). The client application 266 may receive a command from the user to display the image capture screen 1800 for the purposes of scanning a matrix barcode type (e.g., a QR code). Regardless of which image capture screen 1700 or 1800 is displayed, when the UPC barcode 1708 or square matrix barcode is aligned in the image capture area 1709 or 1809, the client application 266 captures the image of the UPC or other barcode (block 2246). Alternatively, the method 2200 allows the user to manually enter the product barcode number 1707. The mobile coupon system 100 then determines what kind of barcode was captured and interprets the barcode to determine with which product the barcode (or manually entered product barcode number 1707) is associated (block 2248). The method 2200 then causes the client application 266 to display on the display 240 of the mobile device 212 the product display screen 1900 (block 2250). The method 2200 may then receive the selection of the "Coupon(s)" button 1914. The method 2200 then determines whether coupons are available (block 2210), filters coupons (FIG. 24), displays the desired coupon if available (block 2212), and the user redeems the coupon at the POS terminal 128 (block 2214) as described above.

Figure 23:
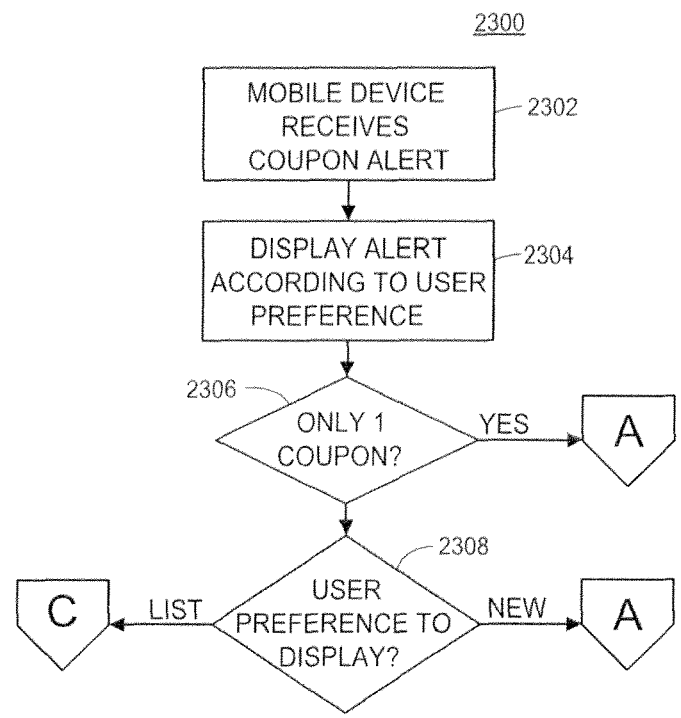
FIG. 23 illustrates an exemplary mobile coupon alert receiving method for implementing the mobile coupon system in accordance with the presently described embodiments.

FIG. 23 is a flow diagram depicting an exemplary embodiment of a mobile coupon alert receiving method 2300 implemented by the mobile coupon system 100. The mobile coupon alert receiving method 2300 receives a coupon alert from the coupon system 100 in the manner described in FIG. 26 (block 2302). If the user has previously entered user preferences regarding how coupon alerts are displayed, these preferences are used to determine whether and how the method 2300 causes the client application 266 to display the coupon on the display 240 (block 2304). Such user preferences may be inputted and accessed by a "Settings" icon on the home screen 222 or by another module or routine. The user preferences may include whether alerts should be displayed at all, at what instances the user would like to receive alerts (e.g., at any time, only when the client application 266 is running, only when a screen associated with the client application 266 is being displayed on the screen 240, etc.), whether alerts should be sent to the mobile device 212 as a text message (e.g., an SMS message) that is received by the operation system 260 with a link or code that may open the client application 266, whether the client application 266 receives the alert as a push notification (e.g., the client application 266 can receive alert messages from the server 202 and alert the user when such alert messages arrive), as well as filtering what kinds of coupons will generate an alert (e.g., filtering by location, category, similar to the filtering applied at block 2402). If the mobile device 212 receives a coupon alert message, the user preferences indicate that the user has opted to receive alert notifications, and the client application 266 does not filter out the coupon alert, the client application 266 may cause the display 240 of the mobile device 212 to display a coupon alert notification 2102 on the mobile device lock screen 2100, as shown in FIG. 21 (block 2304). Alternatively, the coupon alert notification 2102 may appear while the display 240 is displaying any other screen, whether the screen was generated by the client application 266 or not (i.e., the coupon alert notification may appear while the display is displaying a screen generated by one of a plurality of software applications 264). According to user preferences or if the user activates the "View" button 2104, the mobile coupon alert receiving method 2300 may make a function call (blocks 2306 and 2308) to the mobile coupon method 2200 then determines whether the coupon is still available (block 2210), displays the desired coupon if available (block 2212), and the user redeems the coupon at the POS terminal 128 (block 2214) as described above. If more than one coupon alert is received and user preferences indicate that the user prefers to view a list of all received alerts, the mobile coupon alert receiving method 2300 may make a function call (block 2308) to the multiple coupon filtering method 2400 to filter the coupons and select a coupon to display.

In some embodiments, the client application 266 may have a function to filter coupons as discussed above. In such embodiments, the server 202 or central processing system 140 that is sending the coupon alert may only generate alerts for coupons that meet preferences set by the user and/or correspond to the status or location of the mobile device 212. For example, the user may have set a preference on the client application 266 indicating the user only wants to receive coupons for beauty products. The client application 266 may relay this setting to the server 202 and/or central processing system 140. Accordingly, the server 202 or central processing system 140 may only sent alerts to the client application 266 for coupons relating to beauty products. In another example, the server 202 or central processing system 140 may only send coupons that are redeemable at stores 112 that are within a certain distance of the mobile device 212. In some embodiments, the server 202 or central processing system 140 may not send a coupon alert to the client application 266 at all. Instead, the server 202 of central processing system 140 may directly send the coupon to the client application 266 in the manner described in the paragraphs corresponding to FIG. 3-4. In such embodiments, the display 240 of the mobile device 212 may be made to display that coupon as soon as a coupon is received.

Figure 25:
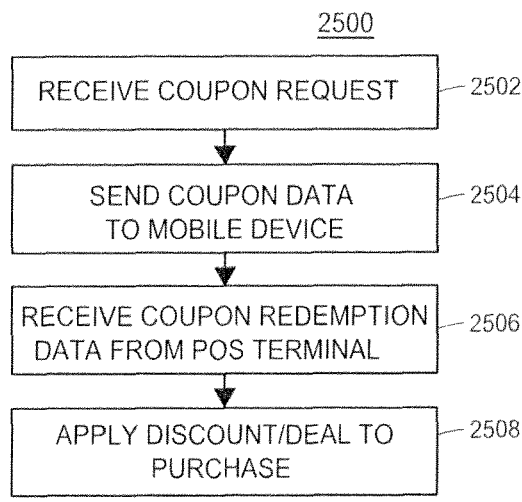
FIG. 25 illustrates an exemplary server-side mobile coupon sending and redemption method for implementing the mobile coupon system in accordance with the presently described embodiments.

FIG. 25 is a flow diagram depicting an exemplary embodiment of a mobile coupon sending and redemption method 2500 implemented by the mobile coupon system 100. More particularly, the method 2500 may be performed by the server 202 or the central processing system 140. Either through activation of a "View Coupons" link 304; activation of a "Coupon(s)" link 1014, 1206, 1406, 1604, 1914; activation of a virtual coupon 610, 702, 802; activation of a "View" button 2104; or any other method of causing the client application 266 to query the server 202 or central processing system 140 for a list of available coupons, the method 2500 receives a request for available coupons over the network 130 (block 2502). If the server 202 is implementing the method 2500, the server 202 may query its program memory 226, RAM 230, database 239, other internal storage, or external storage (e.g., storage central processing system 140, an external computer-readable memory, etc.) to determine if any coupons are available and to send a list of available coupons back to the client application 266 over the network 130 (block 2504). Additionally or alternatively, the central processing system 140 could similarly query its internal storage (e.g., program memory 160, RAM 164, database 146) or external storage to determine if any coupons are available and to send a list of available coupons back to the client application 266 over the network 130. Then, the server 202 or central processing system 140 may receive the coupon code from a POS terminal 128, the coupon code having been scanned, manually typed in, or otherwise inputted to the POS terminal 128 (block 2506). The server 202 may communicate with the central processing system 140 to validate the coupon, or the central processing system 140 may receive and validate the coupon directly. Alternatively, the server 202 may validate the coupon code directly. After the coupon code has been validated, the server 202 or central processing system 140 instructs the POS terminal to apply the discount (or other deal) at the point of sale (block 2506).

Figure 26:
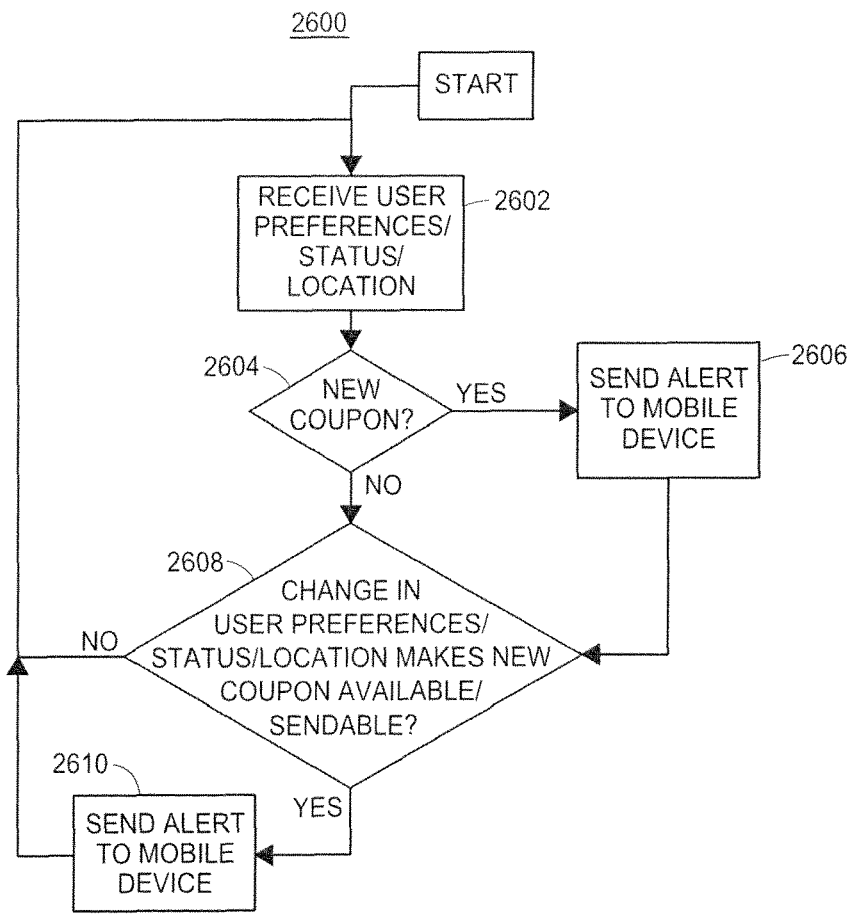
FIG. 26 illustrates an exemplary server-side mobile coupon alert sending method for implementing the mobile coupon system in accordance with the presently described embodiments.

FIG. 26 is a flow diagram depicting an exemplary embodiment of a mobile coupon alert sending method 2600 implemented by the mobile coupon system 100. More particularly, the method 2600 may be performed by the server 202 or the central processing system 140. In some embodiments, the server 202 or central processing system 140 may receive user preferences from the client application 266 over the network 130 (block 2602). As discussed above, such user preferences may include at what instances the user may want to receive alerts, what form the alerts may take (e.g., SMS message, push notification), and what kind of alerts the user wants to received (e.g., only alerts for products in a certain category, location, etc.). In other embodiments, the server 202 or central processing system 140 may send all alerts that are generated in the manner described below and leave the filtering and presentation activities to the client application 266 on the mobile device 212. The server 202 or central processing system 140 may also receive a location of the mobile device 212 (i.e., the client application 266 used the GPS unit 244 to determine location, the user entered the location, or by some other location finding method) (block 2602). In some embodiments, the server 202 or central processing system 140 may additionally or alternatively receive a status of the client application 266. Such a status could be a message indicating that the mobile device 212 has been turned on or awoken from a low power state (e.g., an idle or "sleep" mode), the client application 266 has been launched, the client application 266 has been updated to a newer version, the client application 266 has reestablished connection to the server 202 and/or central processing system 140 over the network 130, or other statuses. (block 2602). The method 2600 then determines whether a new coupon has been added to the system 100 (2604). A new coupon may have been added by inputting a newly available discount or special deal into the system 100 by the system 100 or an administrator (not shown) creating coupon information stored in either or both of the storage of the server 202 or the central processing system 140 or an external media connected to either or both of the server 202 or the central processing system 140. If a new coupon has been created, the method 2600 may send an alert to the client application 266 on the mobile device 212 (block 2606). As discussed above, the method 2600 may determine not to send a coupon alert to the client application 266 on the mobile device 212 based on user preferences, or the method 2600 may include the server 202 or central processing system 140 always sending alerts for a new coupon and leaving the filtering to be performed by the client application 266. The user preferences, location, or status received at block 2602 may indicate that a coupon that was previously unavailable, inapplicable, or unable to be sent is now valid, the method 2600 next includes determining whether to send a coupon alert because of this change in user preference, location, or status. For example, a change in user preference may indicate that a user who previously elected to not receive alerts now wishes to receive alerts. The system 100 may be configured to send, for example, an alert associated with the most recent new coupon to the client application 266 of that user's mobile device 212 via the network 130 (block 2610). Another example of changing user preferences might be that a user who previously did not elect to received alerts associated with coupons for vitamins has changed this election, so the system 100 may sent him a coupon associated with most recent new coupon for vitamins (block 2610). A change in location from a first area to a second area (e.g., from one metro area to another, from one store region to another, from one state to another etc.) may have the consequence that the user may now be able to use area-specific coupons that are only redeemable in the second area. For example, a Chicago, Ill. resident who goes to visit his cousin in Milwaukee, Wis. may be eligible to redeem a coupon that is only valid at a Milwaukee-area store 112. Accordingly, the server 202 or central processing system 140 may send an alert that one or more coupons are available (block 2610). A change in status may indicate, for example, that a client application 266 is not able to receive alerts that it previously could not. In some embodiments, the mobile device 212 may have been turned off or put in an "airplane mode" where the network receiving and transmitting capability was turned off, but now the mobile device 212 is now able to transmit, and the client application 266 communicates with the server 202 or central processing system 140 to indicate this new status. Alternatively or additionally, if the client application 266 has just been launched and is now able to receive alerts, the client application 266 may communicate this new status. If the system 100 receives a status indicating that, for example, the client application 266 is now available to receive alerts where it previously was not, the system 100 may send the coupons that the client application 266 "missed" when it was not able to receive alerts (2610). As shown in FIG. 26, the method 2600 may loop and execute continuously or periodically.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

What is claimed:

1. A method of electronically distributing and redeeming coupons comprising:
    storing a set of electronic coupons on one of one or more server computers, wherein each of the electronic coupons includes a coupon identifier and is associated with an offer;
    receiving at the one or more server computers a coupon request for an electronic coupon from a mobile device, wherein the mobile device includes a mobile couponing application;
    determining which of the electronic coupons from the set ought to be sent to the mobile device;
    receiving a network connection status from the mobile device including a message that the mobile device has been turned on or awoken from a low power state or that the mobile couponing application has been launched and the mobile device is now able to communicate with the one or more server computers;
    identifying electronic coupons that were generated while the mobile device was unable to communicate with the one or more server computers;
    receiving one or more user preferences from the mobile device including alert criteria for determining which of the electronic coupons for which to generate a coupon alert notification;
    comparing a determined electronic coupon from the set of electronic coupons to the alert criteria to determine that the determined electronic coupon meets the alert criteria;
    in response to determining that the determined electronic coupon meets the alert criteria and that the mobile device is now able to communicate with the one or more server computers, sending, by the one or more server computers via the coupon alert notification, the determined electronic coupon to the mobile device and a physical location of a product corresponding to the determined electronic coupon so that a user may use the determined electronic coupon when purchasing a product at a point-of-sale terminal;
    in response to the user selecting a user control to view the determined electronic coupons,
        receiving, at the one or more server computers, a request to determine whether the determined electronic coupon is still available;
        providing an instruction to display the determined electronic coupon on the mobile device via the mobile couponing application in response to determining the determined electronic coupon is still available, wherein the determined electronic coupon includes an indication of a distance or direction for navigating to the product corresponding to the determined electronic coupon according to the physical location of the product;
    receiving at the one or more server computers a redemption request from a point-of-sale terminal, wherein the redemption request is generated by the point-of-sale terminal in response to the point-of-sale terminal receiving the coupon identifier of the determined electronic coupon, the mobile device having been used to input the coupon identifier of the determined electronic coupon into the point-of-sale terminal;
    determining whether to approve the redemption request; and
    if the redemption request is approved, causing the point-of-sale terminal to apply the offer associated with the determined electronic coupon;
    wherein the coupon alert notification activates the mobile couponing application to cause the mobile device to enable connection to the one or more server computers to display the determined electronic coupon.

2. The method of claim 1, further comprising:
    sending a weekly ad to the mobile device, the weekly ad having at least one selectable region that can be selected to generate a coupon request for an electronic coupon associated with the at least one selectable region; and
    wherein determining which of the electronic coupons of the set ought to be sent comprises determining to send an electronic coupon that is associated with the at least one selectable region.

3. The method of claim 1, wherein each of the electronic coupons is associated with at least one store at which it can be redeemed, the method further comprising:
    sending to the mobile device map information including one or more location(s) of one or more nearby stores;
    wherein determining which of the electronic coupons of the set ought to be sent comprises determining to send at least one electronic coupon that is associated with the one or more nearby stores.

4. The method of claim 1, wherein some of the electronic coupons are associated with products, the method further comprising:
    receiving one of a browse query or a search query from the mobile device;
    interpreting the browse query or search query to determine if a first product is associated with the browse query or search query; and wherein determining which of the electronic coupons of the set ought to be sent comprises determining to send one of an electronic coupon that is associated with the first product, an electronic coupon that is associated with a product that is related to the first product, or an electronic coupon that is associated with a product that is a competitor of the first product.

5. The method of claim 1, wherein some of the electronic coupons are associated with products, the method further comprising:
receiving a shopping list from the mobile device comprising at least a first product; and
wherein determining which of the electronic coupons of the set ought to be sent comprises determining to send at least one of an electronic coupon that is associated with the first product, an electronic coupon that is associated with a product that is related to the first product, or an electronic coupon that is associated with a product that is a competitor of the first product.

6. The method of claim 1, wherein some of the electronic coupons are associated with products, the method further comprising:
receiving a product code from the mobile device, wherein the product code is associated with a first product and is generated by the mobile device in response to one of capturing an image of a barcode associated with the first product or user input of the product code;
wherein determining which of the electronic coupons of the set ought to be sent comprises determining to send one of an electronic coupon that is associated with the first product, an electronic coupon that is associated with a product that is related to the first product, or an electronic coupon that is associated with a product that is a competitor of the first product.

7. The method of claim 1, wherein each of the electronic coupons is associated with a redemption location, the method further comprising:
wherein determining which of the electronic coupons of the set ought to be sent comprises determining to send coupon(s) with redemption locations more proximate to the current location of the mobile device and determining to not send coupon(s) with redemption locations less proximate to the current location of the mobile device.

8. The method of claim 1, wherein the set of electronic coupons includes a plurality of coupons and each of the plurality of electronic coupons is associated with a coupon type, the method further comprising:
receiving a user profile associated with the mobile device, the user profile including user interest information indicating that a user is more interested in a first type of coupon than a second type of coupon; and
wherein determining which of the electronic coupons of the set ought to be sent comprises determining to send coupon(s) of the first type and determining to not send coupon(s) of the second type.

9. The method of claim 1, wherein the point-of-sale terminal generates the redemption request in response to the point-of-sale terminal scanning a display of the mobile device to receive the coupon identifier of the determined electronic coupon.

10. The method of claim 1, further comprising:
receiving at one of the one or more server computers one or more of a first data from the mobile device, wherein the first data includes one of a first location of the mobile device, or a first mobile device status;
receiving at one of the one or more server computers one or more of a second data from the mobile device, wherein the second data includes one of a second location of the mobile device, or a second mobile device status;
generating a change indicator if the first data differs from second data;
storing the change indicator on a tangible computer-readable medium; and
wherein the coupon alert notification is sent to the mobile device based on the change indicator.

\* \* \* \* \*